United States Patent [19]
Kajimoto

[11] Patent Number: 5,905,842
[45] Date of Patent: *May 18, 1999

[54] NONLINEAR VIDEO EDITING APPARATUS

[75] Inventor: Kazuo Kajimoto, Neyagawa, Japan

[73] Assignee: Matsushita Electric Industrial Co., Ltd., Osaka-fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/790,536

[22] Filed: Jan. 30, 1997

Related U.S. Application Data

[63] Continuation of application No. 08/374,049, Jan. 18, 1995, abandoned.

[30] Foreign Application Priority Data

Jan. 19, 1994 [JP] Japan .................................. 6-003929

[51] Int. Cl.⁶ .............................. H06N 5/93; G11B 27/00
[52] U.S. Cl. ................................. 386/52; 386/64
[58] Field of Search .................................. 348/46, 52, 65, 348/109, 111, 112, 117, 118, 34, 4; 360/32, 13, 15; 386/52, 55, 56, 64, 4; H06N 5/93; G11B 27/00

[56] References Cited

U.S. PATENT DOCUMENTS 5,126,851  6/1992  Yoshimura et al. ..................... 358/335
5,568,275  10/1996  Norton et al. ............................ 386/52

OTHER PUBLICATIONS

H. Zettl, "Television Production Handbook", Fifth Edition, pp. 345–346 (1992).

Primary Examiner—Robert Chevalier
Attorney, Agent, or Firm—Ratner & Prestia

[57] ABSTRACT

A nonlinear video editing apparatus has a magneto-optical disk for storing a compressed video data, a hard disk for temporarily storing the video data transferred from the magneto-optical disk, and a FIFO buffer for storing the video data from the hard disk for continuously producing the stored video data to an expander at which the compressed video data is expanded. The hard disk has the random access performance faster than that of the magneto-optical disk. Thus, the FIFO buffer can supply the video data to the expander without any interruption.

18 Claims, 21 Drawing Sheets

Fig.3

| SOURCE VIDEO TAPE | | | MASTER VIDEO TAPE | | |
|---|---|---|---|---|---|
| SLICE NAME | FIRST FRAME NO. | LAST FRAME NO. | SLICE NO. | FIRST FRAME NO. | LAST FRAME NO. |
| A | 101 | 104 | 1 | 1 | 4 |
| C | 37101 | 37104 | 2 | 5 | 8 |
| B | 111 | 112 | 3 | 9 | 10 |
| D | 37111 | 37114 | 4 | 11 | 14 |

Fig.15 PRIOR ART

| SOURCE VIDEO TAPE | | | MASTER VIDEO TAPE | | |
|---|---|---|---|---|---|
| SLICE NAME | FIRST FRAME NO. | LAST FRAME NO. | SLICE NO. | FIRST FRAME NO. | LAST FRAME NO. |
| A | 101 | 104 | 1 | 1 | 4 |
| C | 37101 | 37104 | 2 | 5 | 8 |
| B | 111 | 114 | 3 | 9 | 12 |
| D | 37111 | 37114 | 4 | 13 | 16 |

NONLINEAR VIDEO EDITING APPARATUS

This application is a continuation of application Ser. No. 08/374,049 filed Jan. 18, 1995 now abandoned.

BACKGROUND OF THE INVENTION

1. Field of the Invention

The present invention relates to a video editing apparatus for editing video images by dividing the video into plural image shots and then recombining said shots.

2. Description of the Prior Art

FIG. 13 is a block diagram of a conventional nonlinear video editing apparatus. The video editing process with this apparatus consists of dividing a linearly recorded video signal into plural image shots, and then resequencing the reproduction timing of these shots according to the editing information.

The concept of this video editing process using a video tape medium is illustrated in FIG. 14, in which the source video tape is, for example, the tape obtained at the spot where the action took place, the MO (magneto-optical) disk a temporary recording medium on which the video signal from the source video tape is compressed and stored, and the master video tape is, for example, the tape used for news broadcasting in which various numbers of shots from the source video tape are rearranged. The rearrangement of various shots are possible, because of the random access on the MO disk.

As shown in FIG. 14, the video signal of the source video tape 1301 from frame 101 to frame 104 is named shot A; the period from frame 111 to frame 114, shot B; from frame 37101 to frame 37104, shot C; and from frame 37111 to frame 37114, shot D. It is noted that each of shots A, B, C and D includes four frames.

These shots are temporarily stored in the MO dusks and then copied to the new master video tape 1302 in the sequence shot A, shot C, shot B, and shot D. As a result, when the master video tape 1302 is subsequently reproduced, the edited video signal is linearly reproduced in the edited sequence A, C, B, and D.

The editing information used for the editing process shown in FIG. 14 is shown in the table in FIG. 15. This editing information comprises a shot name identifying the shot in the original media, i.e., the source video tape; the first and last frame numbers indicating the recording position of the shot on the source video tape; a shot number indicating the order in which the shots are reproduced from the master video tape; and the first and last reproduction frame numbers identifying the first and last frame numbers of the resequenced shots during reproduction in the master video tape.

Referring again to FIG. 13, the video editing apparatus comprises an editing information memory 1201 storing the above editing information. Data is entered to the editing information memory 1201 by the editor using a keyboard 1202 and/or mouse 1203 or other data entry device.

A magneto-optical (MO) disk 1204 is used to store the video information in a JPEG compression format. The MO disk 1204 is a removable, random-access storage medium accessed using a MO disk drive 1205. The MO disk drive 1205 has a minimum data transfer rate of 8 megabits/sec., and requires a maximum 90 ms to access any given random data.

This standard of MO disk drive performance can be easily achieved: the PMO-650 magneto-optical disk drive marketed by Pinnacle Micro (Irving, Calif., U.S.A.) achieves a data transfer rate of 4.2 megabytes/sec., i.e., 33.6 megabits/sec., in synchronous burst mode transmissions, and an effective random data access speed of 19 ms.

The MO disk drive 1205 is connected in this video editing apparatus by a SCSI interface cable 1206. Data from the MO disk 1204 is input to a 56-kilobyte capacity data FIFO buffer 1207. Data from the data FIFO buffer 1207 is input to the JPEG expander 1208 for data expansion, and is then displayed on the monitor 1209.

The reproduction controller 1210 controls the MO disk drive 1205 according to the editing information from the editing information memory 1201.

The vertical synchronization signal generator 1211 supplies the frame frequency of the NTSC signal to the overall system.

The video signal is compressed according to the JPEG standard to an average capacity of 8 kilobytes/frame before being sequentially stored to the MO disk 1204 with the first video frame assigned to sector 0 of the MO disk 1204. Note that the MO disk 1204 has a 512-byte sector size. Note, also, that if the first frame of each shot is X (such as 101) and the last frame is Y (such as 104), the first and last sectors of each shot can be obtained by the simple equations $16(X-1)$ and $16Y-1$, respectively.

Storage of the video data from the source video tape 1301 to the MO disk 1204 is shown in FIG. 15.

FIG. 16 is a flow chart of the reproduction process of the reproduction controller 1210. This process is described briefly below.

When the reproduction command from the user (editor) is received (1601), the reproduction process begins (1602). This reproduction process starts with a video reproduction set-up routine (1603), is followed by a continuous reproduction routine (1604), and then terminates (1605).

It is to be noted that the variable N used to express the number of the image shot to be processed is used in common throughout the reproduction process. In the above example shown in FIG. 14, since there are four shots A, B, C and D, N increases 1, 2, 3 and 4, and the maximum $N_{max}$ is 4.

FIG. 17 is a flow chart of the video reproduction set-up routine (1603).

When the video reproduction set-up routine is started, the variable N is initialized to '1' (1702).

In step 1703, it is then determined whether a compressed video signal of four frames or more in duration is stored in data FIFO buffer 1207. If there is, the process terminates (1707); if not, control passes to the next step (1704).

In step 1704, the editing information 'a' is referenced, and the MO disk drive control signal 'b' is output to access the starting sector of shot number N on the MO disk 1204.

The compressed video data 'c' of shot N is thus output from the MO disk 1204 to the data FIFO buffer 1207 (1705).

In step 1706, the counter is then incremented (N=N+1), and the process loops back to the test (1703).

The process terminates when step 1703 branches to step 1707.

This operation is described in more detail below with application to the editing information shown in FIG. 15.

When the video reproduction set-up routine is started (1701), the variable N is initialized to '1' (1702), and it is determined whether a compressed video signal of four frames or more in duration is stored in data FIFO buffer 1207 (1703). Since there is not at the initial stage, control passes to the next step (1704).

In step 1704, the editing information 'a' is referenced, and MO disk drive control signal 'b' is output to access sector $640_H$ at the beginning of shot number N on the MO disk 1204.

The compressed video data 'c' of shot 1 is thus output from the MO disk 1204 to the data FIFO buffer 1207 (1705). The data from sector $640_H$ to sector $67F_H$ of the MO disk 1204 is written to the data FIFO buffer 1207 at this time.

The counter is then incremented to N=2, and the process loops back to the test (1703).

In this pass, however, step 1703 determines that there are four frames or more of compressed video data stored to the data FIFO buffer 1207, and control branches to step 1707, thus terminating the video reproduction set-up routine.

FIG. 18 is a flow chart of the continuous reproduction routine. This routine basically comprises two subroutines that execute in parallel: a JPEG expansion control routine 1801 for controlling the JPEG expander 1208 from the data FIFO buffer 1207, and a data FIFO buffer fill routine 1802 for controlling data transfer from the MO disk 1204 to the data FIFO buffer 1207.

FIG. 19 is a flow chart of the JPEG expansion control process 1801.

Once the JPEG expansion control routine starts, it is determined whether compressed video data is stored in the data FIFO buffer 1207 (1902). If there is, control passes to the next step (1903); if not, the process terminates (1904).

In step 1903, one frame of compressed video data 'd' is read synchronized to the vertical synchronization signal from the data FIFO buffer 1207, and JPEG expansion control signal 'f' is output to the JPEG expander 1208 to expand the compressed data and thereby reproduce the original video data 'e'. Control then loops back to the test (1902).

As a result, one frame at a time is reproduced synchronized to the vertical synchronization signal for as is long as there is compressed video data stored in the data FIFO buffer 1207.

FIG. 20 is a flow chart of the data FIFO buffer fill routine 1802.

Once the data FIFO buffer fill routine starts, it is determined if there are four or fewer frames of compressed video data stored in the data FIFO buffer 1207 (2002). If there are, control flows to step 2003; if not, it loops back to 2002.

In step 2003, the editing information 'a' is referenced to determine whether shot N is equal to or less than the maximum shot number $N_{max}$. If it is, control flows to step 2004; if not, it jumps to step 2007 and the process terminates.

In step 2004, the MO disk drive control signal 'b' is output to access the starting sector of shot number N on the MO disk 1204.

The compressed video data 'c' of shot N is thus output from the MO disk 1204 to the data FIFO buffer 1207 (2005).

In step 2006, the counter is then incremented (N=N+1), and the process loops back to the test (2002).

The process terminates at step 2007.

Continuous reproduction of the editing information shown in FIG. 15 is shown in FIG. 21 and described below.

In FIG. 21, the upper section (a) illustrates control of the MO disk drive 1205 with the passage of time; and the lower section (b) shows the change in the number of frames remaining in the data FIFO buffer 1207.

When continuous reproduction starts, i.e., at 0 ms on the time scale, it is assumed that shot 1, i.e., shot A is already transferred to the data FIFO buffer 1207. Thus, there are already four frames of shot 1 stored in the data FIFO buffer 1207. The condition for the data FIFO buffer fill routine 1207, particularly step 2002, is therefore satisfied, and the MO disk drive control signal 'b' is output to the MO disk drive 1205 to access the starting sector ($90EC0_H$) of shot 2, i.e., shot C, on the MO disk 1204. The MO disk drive 1205 therefore accomplishes a seek operation to access sector $90EC0_H$. The worst-case access time required for this operation is 90 ms.

Thus assuming the worst-case access time of 90 ms is required, 90 ms after the start of continuous reproduction, the 64 sectors, or 32 kilobytes, of data from sector $90EC0_H$ to sector $90EFF_H$ corresponding to shot 2 are read from the MO disk 1204 and output to the data FIFO buffer 1207. Because the data transfer rate of the MO disk drive 1205 is at worst 8 megabits/sec., this data transfer requires approximately 32 ms; data transfer is therefore completed at 122 ms after the start of continuous reproduction.

Thus, from the starting moment at 0 ms, access to the sector $90EC0_H$ on the MO disk 1204 starts and, at the same time, transfer of four frames of shot 1 from data FIFO buffer 1207 to JPEG expander 1208 starts. In other words, the access operation in MO disk 1204 and the transfer operation in FIFO 1207 are carried in parallel.

It is noted that the transfer of the frames from data FIFO buffer 1207 to JPEG expander 1208 is carried out such that, during one frame transfer, no data shift takes place in FIFO buffer 1207, but when one frame data is transferred, data shift of one frame takes place in FIFO buffer 1207. It takes about 33 ms to transfer one frame. Thus, as shown in FIG. 21, such as by line L2, the amount of data remaining in FIFO buffer 1207 is decreased in steps.

After 90 ms from the start, the access operation to the sector $90EC0_H$ on the MO disk 1204 completes so that transfer from MO disk 1204 to FIFO buffer 1207 starts. By the data transfer from the MO disk to the FIFO buffer, the data amount in FIFO buffer 1207 increases linearly, as shown by line L1 at the bottom of FIG. 21. At this time the step decrease in the FIFO buffer still continues. Thus, after 90 ms on the time scale, the linear increase L1 and the step decrease L2 of the data in the FIFO buffer 1207 are effected simultaneously. Thus, the data amount in FIFO buffer 1207 would be L1+L2 to present a serrated line as shown in section (b) in FIG. 21.

At the end of this data transfer operation, i.e., at a moment just before 133 ms on the time scale, 5 frames of data are stored (remain) in the data FIFO buffer 1207. The counter N is also incremented to N=3 after this data transfer operation, so that in the next cycle, shot 3 (shot B) will be transferred from the MO disk to the FIFO buffer.

At 133 ms after the start of continuous reproduction, there are again 4 frames remaining in the data FIFO buffer 1207. The condition required for the data FIFO buffer fill routine 1802 (2002) is therefore again satisfied, and the MO disk drive control signal 'b' is output to the MO disk drive 1205 to access the starting sector ($6E0_H$) of shot 3 on the MO disk 1204. The MO disk drive 1205 therefore accomplishes a seek operation to access sector $6E0_H$. The worst-case access time required for this operation is 90 ms.

Thus assuming the worst-case access time of 90 ms is required, 223 ms after the start of continuous reproduction, the 64 sectors, or 32 kilobytes, of data from sector $6E0_H$ to sector $71F_H$ corresponding to shot 3 are read from the MO disk 1204 and output to the data FIFO buffer 1207. Because the data transfer rate of the MO disk drive 1205 is at worst 8 megabits/sec., this data transfer requires approximately 32 ms; data transfer is therefore completed at 255 ms after the start of continuous reproduction.

At the end of this data transfer operation, the number of frames stored (remaining) in the data FIFO buffer 1207 again increases to 5. The counter N is also incremented to N=4 after this data transfer operation, so that in the next cycle, shot 4 (shot D) will be transferred from the MO disk to the FIFO buffer.

At 267 ms after the start of continuous reproduction, there are again 4 remaining frames in the data FIFO buffer 1207. The condition required for the data FIFO buffer fill routine 1802 (2002) is therefore again satisfied, and the MO disk drive control signal 'b' is output to the MO disk drive 1205 to access the starting sector ($90F60_H$) of shot 4 on the MO disk 1204. The MO disk drive 1205 therefore accomplishes a seek operation to access sector $90F60_H$. The worst-case access time required for this operation is 90 ms.

Thus assuming the worst-case access time of 90 ms is required, 357 ms after the start of continuous reproduction, the 64 sectors, or 32 kilobytes, of data from sector $90F60_H$ to sector $90F9F_H$ corresponding to shot 4 are read from the MO disk 1204 and output to the data FIFO buffer 1207. Because the data transfer rate of the MO disk drive 1205 is at worst 8 megabits/sec., this data transfer requires approximately 32 ms; data transfer is therefore completed at 389 ms after the start of continuous reproduction.

At the end of this data transfer operation, the number of frames stored (remaining) in the data FIFO buffer 1207 again increases to 5. The counter N is also incremented to N=5 after this data transfer operation, so that in the next cycle, since shot 5 is not defined in the MO disk, no data will be transferred from the MO disk to the FIFO buffer.

At 400 ms after the start of continuous reproduction, there are again 4 remaining frames in the data FIFO buffer 1207. The condition required for the data FIFO buffer fill routine 1802 (2002) is therefore again satisfied, but because there is no shot 5, condition 2003 is satisfied and the data FIFO buffer fill routine 1802 terminates.

The JPEG expansion control routine 1801 deletes one frame of data from the data FIFO buffer 1207 at each vertical synchronization cycle, and the JPEG expansion control routine 1801 terminates 533 ms after the start of continuous reproduction because test 1902 in the JPEG expansion control routine 1801 returns NO.

By means of the conventional nonlinear video editing apparatus as described above, FIFO can continuously provide data to the JPEG expander 1208 without any stop during the transfer of shots A, C, B, D. In other words, the data FIFO buffer 1207 is never emptied with this video data sequence during said transfer. Thus, in the above example of the editing information shown in FIG. 15, it is therefore possible to continuously reproduce the video stored to the MO disk 1204. The following problems are, however, presented by this nonlinear video editing apparatus of the prior art.

It is assumed below that the editing information is as shown in FIG. 3. This editing information differs from that in FIG. 15 only in that shot B is only two frames long instead of four.

The operation in this case is described below. Note that the video reproduction set-up routine is the same as with the data shown in FIG. 15. Continuous reproduction based on the editing information shown in FIG. 3 is shown in FIG. 22 and described below.

In FIG. 22, the upper section (a) illustrates control of the MO disk drive 1205 with the passage of time; and the lower section (b) shows the change in the number of frames remaining in the data FIFO buffer 1207.

When continuous reproduction starts, i.e., at 0 ms on the time scale, there are already four frames remaining in the data FIFO buffer 1207. The conditions for the data FIFO buffer fill routine 1802 (2002) are therefore satisfied, and the MO disk drive control signal 'b' is output to the MO disk drive 1205 to access the starting sector ($90EC0_H$) of shot 2 on the MO disk 1204. The MO disk drive 1205 therefore accomplishes a seek operation to access sector $90EC0_H$. The worst-case access time required for this operation is 90 ms.

Thus assuming the worst-case access time of 90 ms is required, 90 ms after the start of continuous reproduction, the 64 sectors, or 32 kilobytes, of data from sector $90EC0_H$ to sector $90EFF_H$ corresponding to shot 2 (shot C) are read from the MO disk 1204 and output to the data FIFO buffer 1207. Because the data transfer rate of the MO disk drive 1205 is at worst 8 megabits/sec., this data transfer requires approximately 32 ms; data transfer is therefore completed at 122 ms after the start of continuous reproduction.

At the end of this data transfer operation, 5 frames of data are stored (remain) in the data FIFO buffer 1207. The counter N is also incremented to N=3 after this data transfer operation.

At 133 ms after the start of continuous reproduction, there are again 4 remaining frames in the data FIFO buffer 1207. The condition required for the data FIFO buffer fill routine 1802 (2002) is therefore again satisfied, and the MO disk drive control signal 'b' is output to the MO disk drive 1205 to access the starting sector ($6E0_H$) of shot 3 (shot B) on the MO disk 1204. The MO disk drive 1205 therefore accomplishes a seek operation to access sector $6E0_H$. The worst-case access time required for this operation is 90 ms.

Thus assuming the worst-case access time of 90 ms is required, 223 ms after the start of continuous reproduction, the 32 sectors, or 16 kilobytes, of data from sector $6E0_H$ to sector $6FF_H$ corresponding to shot 3 (shot B) are read from the MO disk 1204 and output to the data FIFO buffer 1207. Because the data transfer rate of the MO disk drive 1205 is at worst 8 megabits/sec., this data transfer requires approximately 16 ms; data transfer is therefore completed at 239 ms after the start of continuous reproduction.

At the end of this data transfer operation, the number of frames stored (remaining) in the data FIFO buffer 1207 has increased to only 3. The counter N is also incremented to N=4 after this data transfer operation.

Because there are only 3 frames remaining in the data FIFO buffer 1207, step 2002 of the data FIFO buffer fill routine 1802 is immediately satisfied (YES), and the MO disk drive control signal 'b' is output to the MO disk drive 1205 to access the starting sector ($90F60_H$) of shot 4 (shot D) on the MO disk 1204. The MO disk drive 1205 therefore accomplishes a seek operation to access sector $90F60_H$. The worst-case access time required for this operation is 90 ms.

Thus assuming the worst-case access time of 90 ms is required, 329 ms after the start of continuous reproduction, the 64 sectors, or 32 kilobytes, of data from sector $90F60_H$ to sector $90F9F_H$ corresponding to shot 4 are read from the MO disk 1204 and output to the data FIFO buffer 1207. Because the data transfer rate of the MO disk drive 1205 is at worst 8 megabits/sec., this data transfer requires approximately 32 ms; data transfer is therefore completed at 361 ms after the start of continuous reproduction.

However, at 333 ms after the start of continuous reproduction, the one remaining frame in the data FIFO buffer 1207 is read and expanded, thus emptying the data FIFO buffer 1207, satisfying step 1902 of the JPEG expansion control routine 1801, and thereby effecting an interrupt and terminating the continuous reproduction routine.

Therefore, when reproducing by means of a conventional nonlinear video editing apparatus based on the editing information video data stored to the MO disk 1204, poor random access performance results in the data FIFO buffer 1207 emptying when the video data shots are short as shown in FIG. 3, or when the data compression ratio is low and the data size of the same number of frames increases, and continuous reproduction therefore becomes impossible.

SUMMARY OF THE INVENTION

Therefore, an object of the present invention is to provide a nonlinear video editing apparatus whereby nonlinear editing is possible even using media with poor random access performance.

To achieve this object, a nonlinear video editing apparatus according to the present invention comprises: first video data storage means for storing a video data, said first video data storage means having random access performance and data transfer performance; second video data storage means for storing the video data transferred from said first video data storage means, said second video data storage means having random access performance and data transfer performance, but with a higher speed random access performance than that of the first video storage means; FIFO buffer for storing the video data from the second video storage means and for continuously producing the stored video data; editing information memory means for storing editing information comprising, first and last frame positions before the video editing, and first and last frame positions after the video editing; and reproduction control means for controlling the first and second video storage means according to the editing information, such that the video data from the first video storage means is temporarily stored in the second video storage means and then being transferred to the data FIFO buffer.

In a nonlinear video editing apparatus thus comprised, the reproduction control means interprets the editing information in the editing information memory and copies the video data to be reproduced from the second video storage means to the first video storage means in the set-up routine, and transfers the video signal pre-stored to the first video storage means to the data FIFO buffer if the remaining number of unreproduced frames in the data FIFO buffer becomes simultaneously less than a predetermined level.

BRIEF DESCRIPTION OF THE DRAWINGS

The present invention will become more fully understood from the detailed description given below and the accompanying diagrams wherein:

FIG. 3 is a table showing the video editing information for the case shown in FIG. 2;

FIG. 15 is a table showing the video editing information for the case shown in FIG. 14;

DESCRIPTION OF PREFERRED EMBODIMENTS

Figure 1:
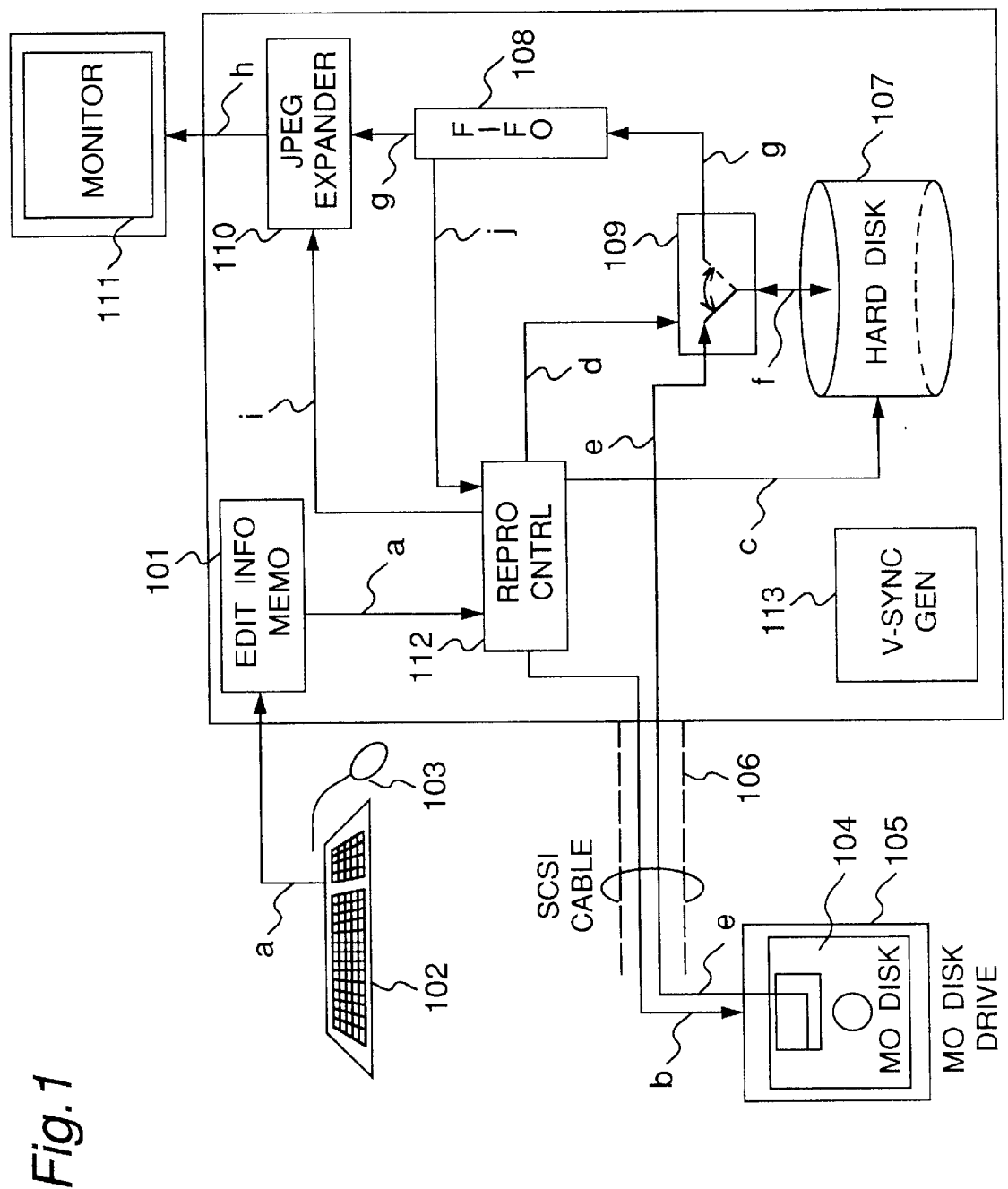
FIG. 1 is a block diagram of a nonlinear video editing apparatus according to a first embodiment of the present invention.

The first embodiment of a nonlinear video editing apparatus according to the invention is described below with reference to FIG. 1.

The video editing process consists of dividing the continuously recorded video signal into plural image shots, and then resequencing the reproduction timing of these shots according to the editing information.

Figure 2:
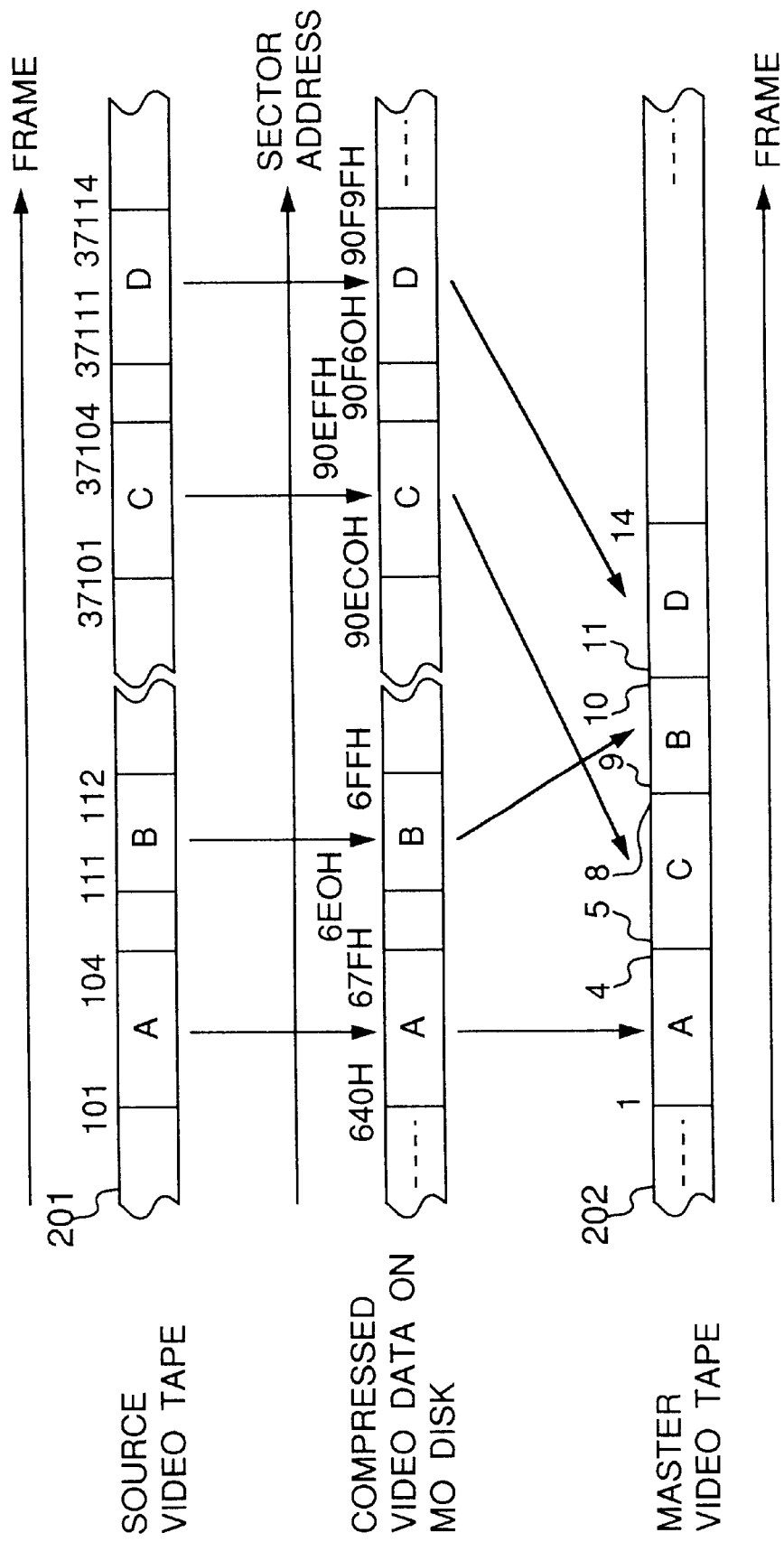
FIG. 2 is a diagram showing one example of the rearrangement of the shots.
Figure 14:
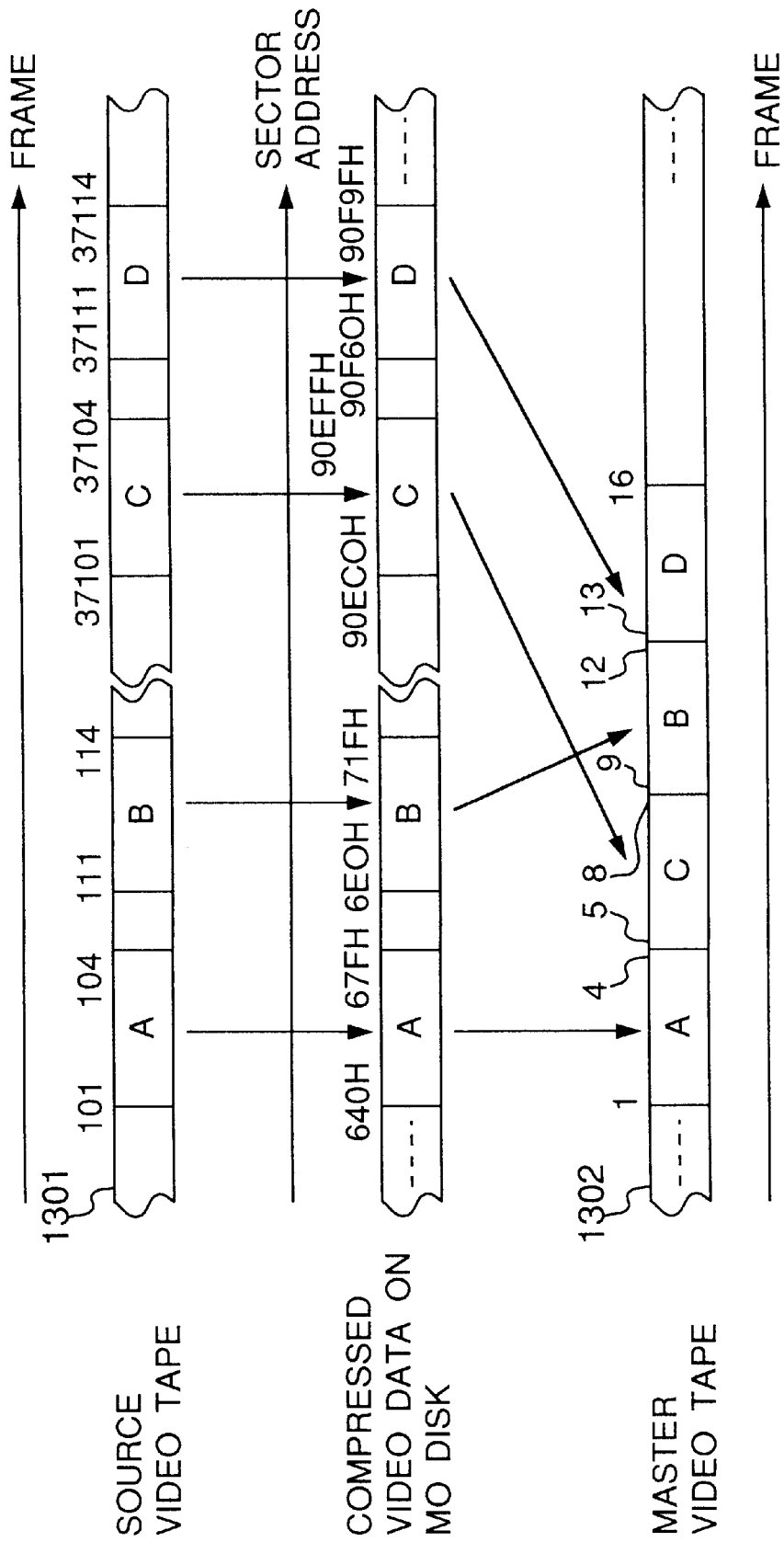
FIG. 14 is a diagram showing one example of the rearrangement of the shots.

The concept of this video editing process using a video tape medium is illustrated in FIG. 2 which is similar to that described above in connection with FIG. 14.

As shown in FIG. 2, the video signal of the source video tape 201 from frame 101 to frame 104 is named shot A; the period from frame 111 to frame 112, shot B; from frame 37101 to frame 37104, shot C; and from frame 37111 to frame 37114, shot D. It is noted that each of shots A, C and D includes four frames, and shot B includes two frames.

These shots are temporarily stored in the MO dusks and then copied to the new master video tape 202 in the sequence shot A, shot C, shot B, and shot D. As a result, when the master video tape 202 is subsequently reproduced, the edited video signal is linearly reproduced in the edited sequence A, C, B, and D.

The editing information used for the editing process shown in FIG. 2 is shown in the table in FIG. 3. This editing information comprises a shot name for identifying the shot in the original media, i.e., the source video tape 201; the first and last frame numbers indicating the recording position of the shot on the source video tape 201; a shot number indicating the order in which the shots are reproduced from the master video tape 202; and the first and last reproduction frame numbers identifying the first and last frame numbers of the resequenced shots during reproduction.

Referring again to FIG. 1, this video editing apparatus comprises an editing information memory 101 storing the above editing information of FIG. 3. Data is entered to the editing information memory 101 by the editor using a keyboard 102 and/or mouse 103 or other data entry device.

A magneto-optical (MO) disk 104 is used to store the video information in a JPEG compression format. The MO disk 104 is a removable, random-access storage medium accessed using a MO disk drive 105. The MO disk drive 105 has a worst-case data transfer rate of 8 megabits/sec., and requires a maximum 90 ms to access any given random data.

This standard of MO disk drive performance can be easily achieved: the PMO-650 magneto-optical disk drive marketed by Pinnacle Micro (Irving, Calif., U.S.A.) achieves a data transfer rate of 4.2 megabytes/sec., i.e., 33.6 megabits/sec., in synchronous burst mode transmissions, and an effective random data access speed of 19 ms.

The MO disk drive 105 is connected in this video editing apparatus by a SCSI interface cable 106.

A hard disk drive 107 with a worst-case 20 megabit/sec. data transfer rate and maximum random access time of 22 ms is also provided.

This standard of hard disk drive 107 performance can also be easily achieved: the Maxtor MXT-504 hard disk drive (Maxtor Peripherals, San Jose, Calif., U.S.A.) provides a minimum data transfer rate of 23 megabits/sec., and a maximum random access time of 20 ms.

Video data is input to the hard disk drive 107 through a data switch 109, which is controlled by the reproduction controller 112 to write the data output from the MO disk drive 105 to the hard disk drive 107 or to the data FIFO buffer 108, which has a 56-kilobyte storage capacity.

Data from the data FIFO buffer 108 is input to the JPEG expander 110 for data expansion, and is then displayed on the monitor 111.

The reproduction controller 112 controls the MO disk drive 105, hard disk drive 107, and data switch 109 according to the editing information from the editing information memory 101.

The vertical synchronization signal generator 113 supplies the frame frequency of the NTSC signal to the overall system.

The video is compressed according to the JPEG standard to an average capacity of 8 kilobytes/frame before being sequentially stored to the MO disk 1204 with the first video frame assigned to sector 0 of the MO disk 1204. Note that the MO disk 104 and the hard disk drive 107 both have a 512 byte sector size. Note, also, that if the first frame of each shot is X and the last frame is Y, the first and last sectors of each shot can be obtained by the simple equations 16(X−1) and 16Y−1, respectively.

Storage of the compressed video data on the MO disk 104 from the source video tape is shown in FIG. 2.

Figure 5:
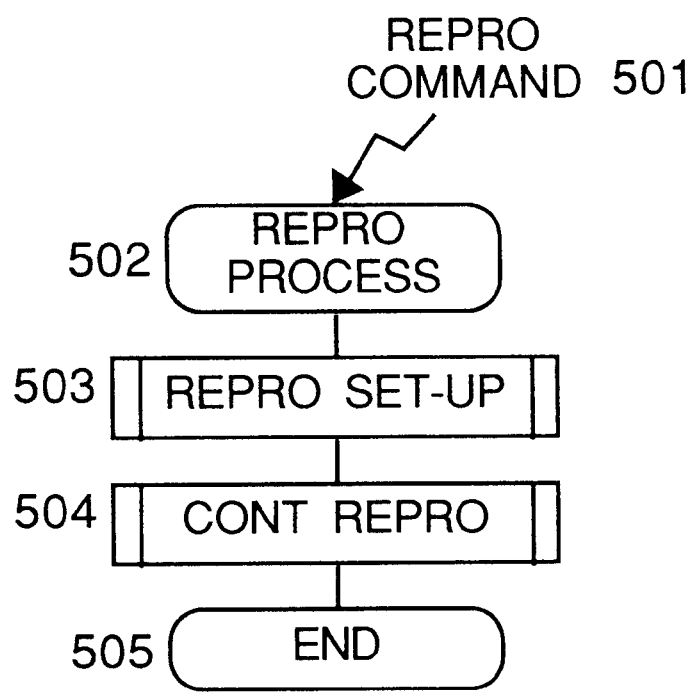
FIG. 5 is a flow chart of the reproduction process of the reproduction controller of FIG. 1.

FIG. 5 is a flow chart of the reproduction process of the reproduction controller 112. This process is described briefly below.

When the reproduction command from the user (editor) is received (501), the reproduction process begins (502). This reproduction process starts with a video reproduction set-up routine (503), is followed by a continuous reproduction routine (504), and then terminates (505).

It is to be noted that the variable N used to express the number of the image shot to be processed, and the hard disk buffer start and end pointers to the start and end data sectors on the hard disk drive 107, are used in common throughout the reproduction process. In the above example shown in FIG. 2, since there are four shots A, B, C and D, N increases 1, 2, 3 and 4, and the maximum $N_{max}$ is 4.

It is to be noted that the area from the sector pointed to by the hard disk (HD) buffer start pointer to the sector pointed to by the HD buffer end pointer is defined as the hard disk buffer.

Figure 6:
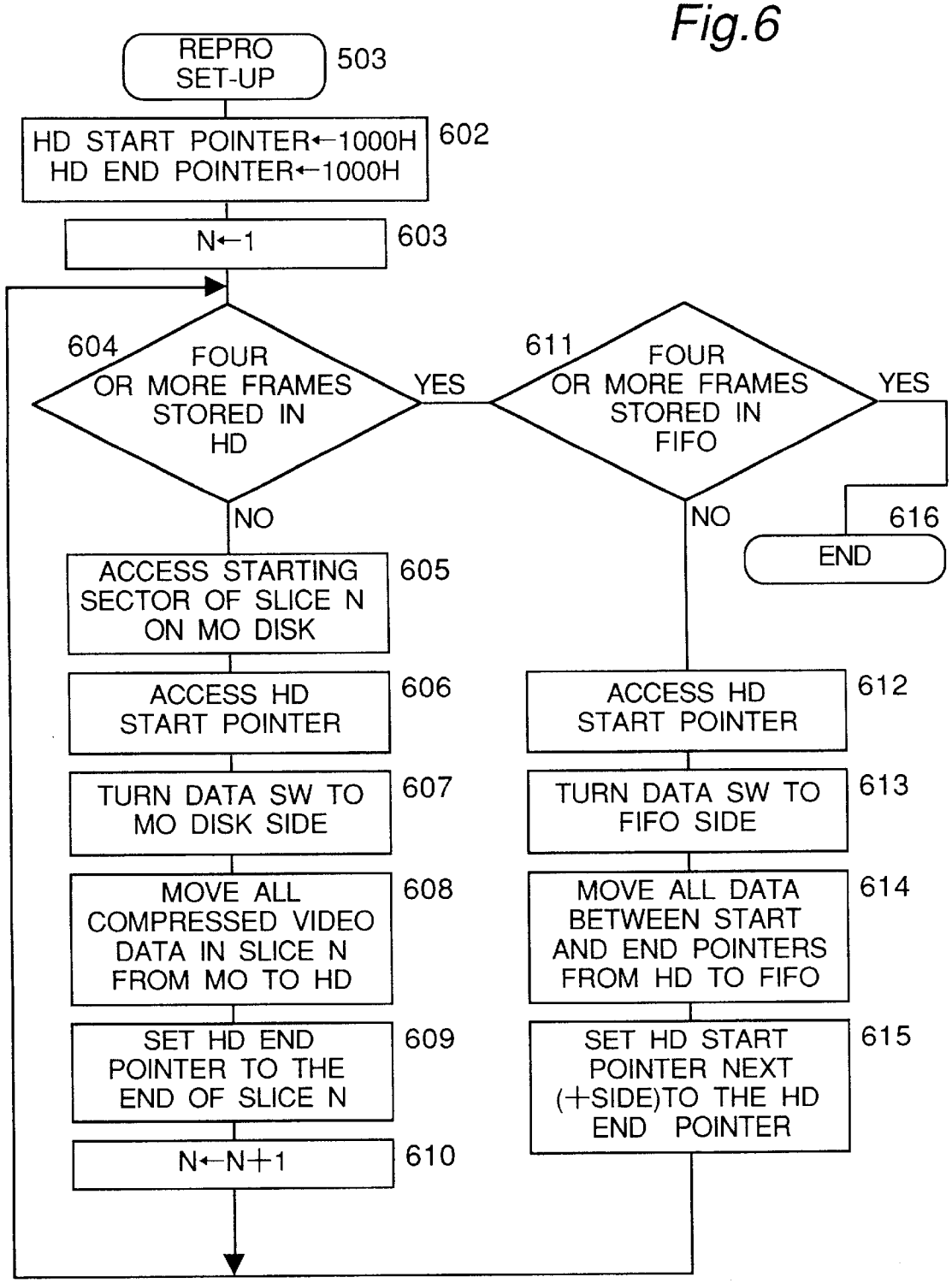
FIG. 6 is a detailed flow chart of the reproduction set-up process shown in FIG. 5.

FIG. 6 is a detailed flow chart of the video reproduction set-up routine (503).

Figure 4A:
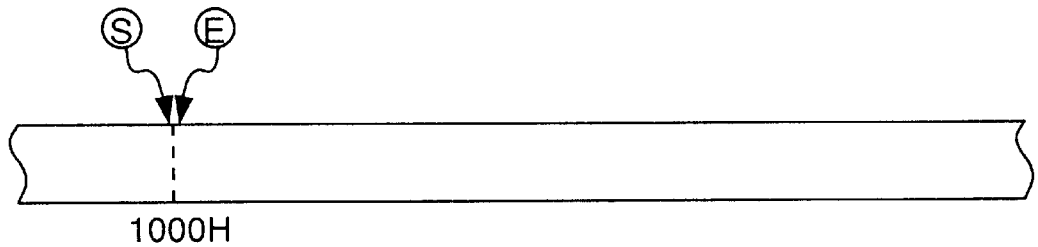
FIGS. 4A, 4B, 4C and 4D are diagrams showing data temporarily stored in the hard disk of FIG. 1.

When the video reproduction set-up routine is started, the HD buffer start pointer and the HD buffer end pointer are initialized to $1000_H$ (602), as shown in FIG. 4A, and the variable N is initialized to '1' (603). Also the maximum shot number $N_{max}$ is set.

It is then determined whether a compressed video signal of four frames or more in duration is stored in the hard disk buffer. More specifically, it is determined whether there are 64 or more sectors from the HD buffer start pointer to the HD buffer end pointer. If there are, the process branches to step 611; if not, control passes to the next step (605).

In step 605, the editing information 'a' is referenced, and MO disk drive control signal 'b' is output to access the starting sector of shot number N on the MO disk 104.

In step 606, HD control signal 'c' is output to access the sector pointed to by the HD buffer start pointer to the hard disk drive 107.

In step 607, the data switch control signal 'd' is output to switch the data switch 109 to throughput data from the MO disk drive 105 to the HD buffer 107.

In step 608, the compressed video data 'e' for shot N is written from the MO disk 104 to the hard disk drive 107.

Figure 4B:
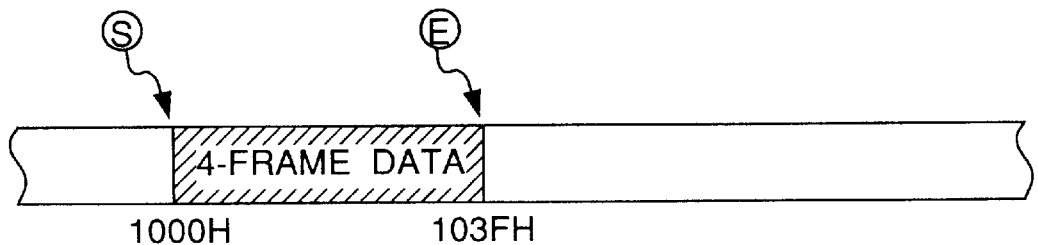

In step 609, the HD buffer end pointer is set to the sector number of the hard disk to which the last sector of shot N was written, as shown in FIG. 4B.

In step 610, the counter is then incremented (N=N+1), and the process loops back to the test (604).

In step 611, it is determined whether a compressed video signal of four frames or more in duration is stored in the data FIFO buffer 108; if not, control passes to the next step 612; if there is, control branches to step 616, and the routine terminates.

In step 612, HD control signal 'c' is output to access the sector pointed to by the HD buffer start pointer to the hard disk drive 107.

In step 613, the data switch control signal 'd' is output to switch the data switch 109 to throughput data from the hard disk to the data FIFO buffer 108.

In step 614, the data stored to the hard disk buffer, i.e., the data stored from the HD buffer start pointer to the HD buffer end pointer, as shown in FIG. 4B, is output from the hard disk drive 107 to the data FIFO buffer 108.

Figure 4C:
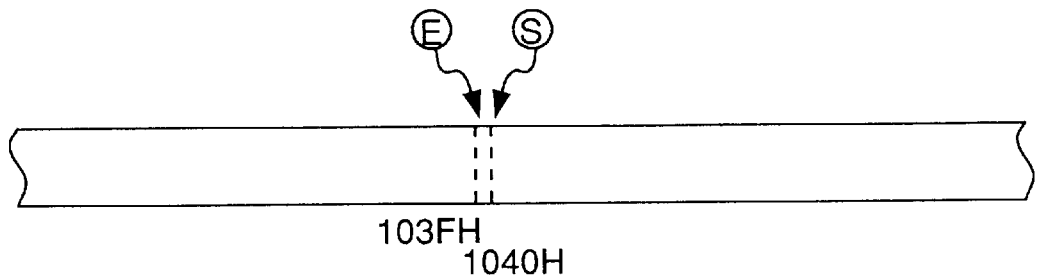

In step 615, the HD buffer start pointer is reset to the new value (HD buffer end pointer+1), as shown in FIG. 4C, and the process loops back to the test (604).

The process terminates in step 616.

The operation is described in more detail below with application to the editing information shown in FIG. 3.

When the video reproduction set-up routine is started (601), the HD buffer start pointer and the HD buffer end pointer are initialized to $1000_H$ (602), as shown in FIG. 4A, and the variable N is initialized to '1' (603), and the maximum shot number $N_{max}$ is set to four.

It is then determined whether a compressed video signal of four frames or more in duration is stored in the hard disk buffer. Since there is not, control passes to the next step (605).

In step 605, the editing information 'a' is referenced, and MO disk drive control signal 'b' is output to access the starting sector $640_H$ of shot number 1 on the MO disk 104.

In step 606, HD control signal 'c' is output to access the sector $1000_H$ pointed to by the HD buffer start pointer to the hard disk drive 107.

In step 607, the data switch control signal 'd' is output to switch the data switch 109 to throughput data from the MO disk drive 105.

In step 608, the compressed video data 'e' for shot N (=1) is written from the MO disk 104 to the hard disk drive 107. In this example, the data from sector $640_H$ to sector $67F_H$ of the MO disk 104 is written to sectors $1000_H$ to $103F_H$ of the hard disk drive 107.

In step 609, the HD buffer end pointer is set to $103F_H$, as shown in FIG. 4B.

In step 610, the counter N is incremented to N=2, and the process loops back to the test (604).

In step 604, it is again determined whether a compressed video signal of four frames or more in duration is stored in the hard disk buffer. Since data was written, control branches to step 611.

In step 611, it is determined whether a compressed video signal of four frames or more in duration is stored in the data FIFO buffer 108. Since there is not, the control passes to the next step 612.

In step 612, HD control signal 'c' is output to access the hard disk 107, particularly the sector pointed to by the HD buffer start pointer.

In step 613, the data switch control signal 'd' is output to switch the data switch 109 to throughput data from the hard disk to the data FIFO buffer 108.

In step 614, the data stored to the hard disk buffer, i.e., the data stored from the HD buffer start pointer to the HD buffer end pointer, as shown in FIG. 4B, is output from the hard disk drive 107 to the data FIFO buffer 108.

In step 615, the HD buffer start pointer is reset to the new value $1040_H$, as shown in FIG. 4C, and the process loops back to the test (604).

In step 604, it is again determined whether a compressed video signal of four frames or more in duration is stored in the hard disk buffer. Since there is not, control passes to the next step (605).

In step 605, the editing information 'a' is again referenced, and MO disk drive control signal 'b' is output to access the starting sector $90EC0_H$ of shot number 2 on the MO disk 104.

In step 606, HD control signal 'c' is output to access the sector $1040_H$ pointed to by the HD buffer start pointer to the hard disk drive 107.

In step 607, the data switch control signal 'd' is output to switch the data switch 109 to throughput data from the MO disk drive 105.

In step 608, the compressed video data 'e' for shot N is written from the MO disk 104 to the hard disk drive 107. In this example, the data from sector $90EC0_H$ to sector $90EFF_H$ of the MO disk 104 is written to the hard disk drive 107 from sector $1040_H$ to sector $107F_H$.

Figure 4D:
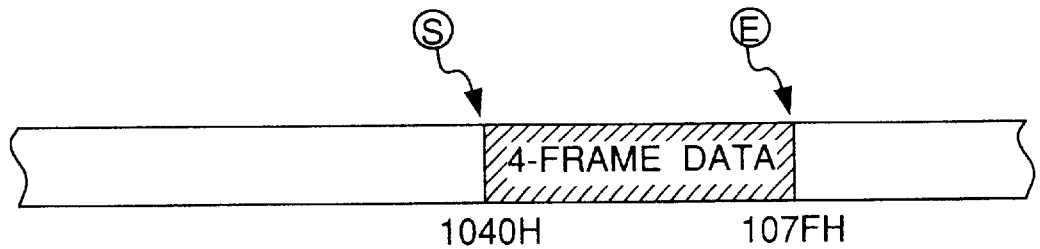

In step 609, the HD buffer end pointer is set to $107F_H$, as shown in FIG. 4D.

In step 610, the counter N is incremented to N=3, and the process loops back to the test (604).

In step 604, it is again determined whether a compressed video signal of four frames or more in duration is stored in the hard disk buffer. Since data was written, control branches to step 611.

In step 611, it is determined whether a compressed video signal of four frames or more in duration is stored in the data FIFO buffer 108. Since there is, control branches to step 616, and the preparation routine terminates.

Figure 7:
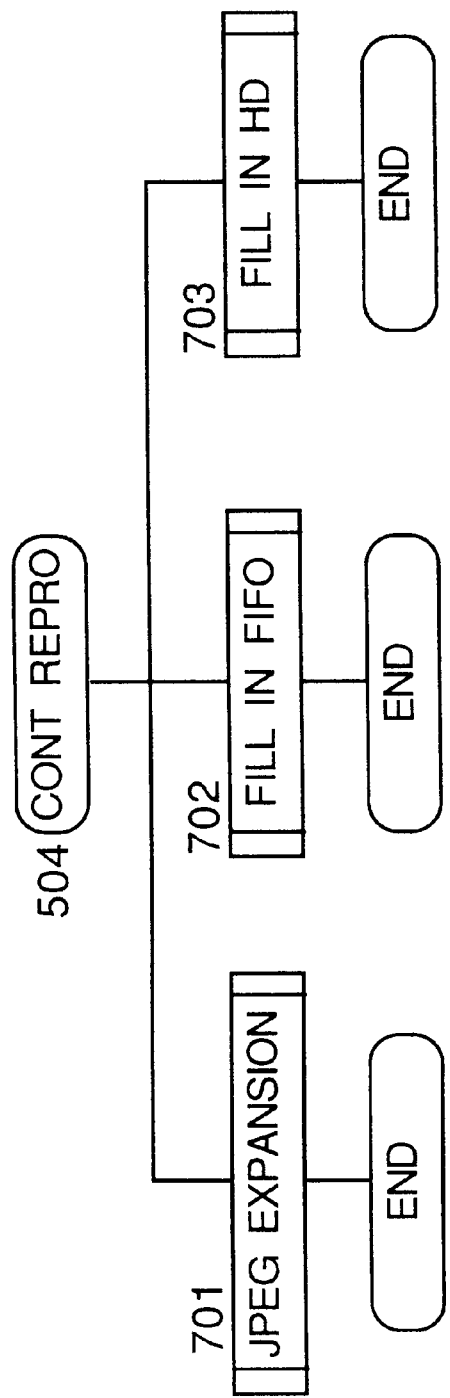
FIG. 7 is a flow chart of the continuous reproduction process shown in FIG. 5.

FIG. 7 is a flow chart of the continuous reproduction routine. This routine basically comprises three subroutines that execute in parallel: a JPEG expansion control routine 701 for controlling the JPEG expander 110 from the data FIFO buffer 108; a data FIFO buffer fill in routine 702 for controlling data transfer from the hard disk drive 107 to the data FIFO buffer 108; and a HD buffer fill in routine 703 for controlling data transfer from the MO disk 104 to the hard disk drive 107.

Figure 8:
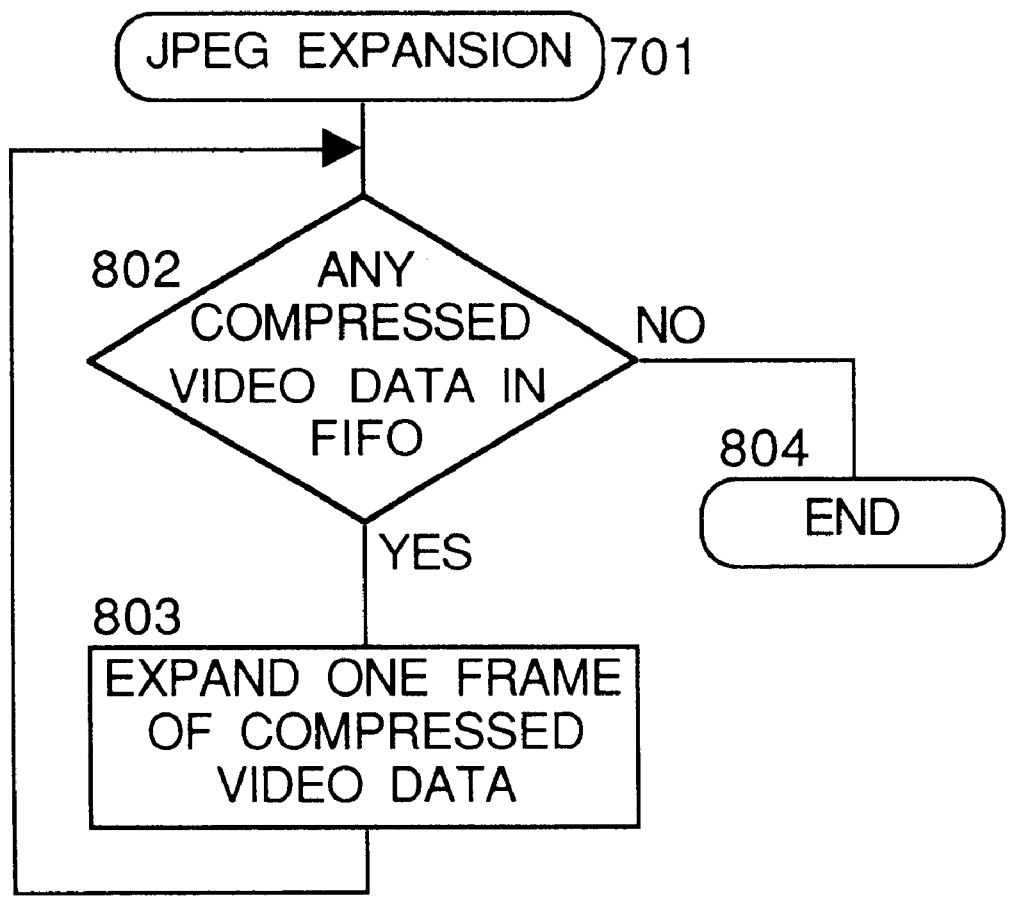
FIG. 8 is a detailed flow chart of the JPEG expansion control process shown in FIG. 7.

FIG. 8 is a flow chart of the JPEG expansion control process 701.

Once the JPEG expansion control routine starts, it is determined whether compressed video data is stored in the data FIFO buffer 108 (802). If there is, control passes to the next step (803); if not, the process terminates (804).

In step 803, one frame of compressed video data 'g' is read synchronized to the vertical synchronization signal from the data FIFO buffer 108, and JPEG expansion control signal 'i' is output to the JPEG expander 110 to expand the compressed data and thereby reproduce the original video data 'h'. Control then loops back to the test (802).

The routine terminates when control is passed to step 804.

As a result, one frame at a time is reproduced synchronized to the vertical synchronization signal for as long as there is compressed video data stored in the data FIFO buffer 108. In other words, if the data FIFO buffer 108 is emptied during the continuous reproduction, the reproduction terminates, even if the data FIFO buffer 108 is filled in again.

Figure 9:
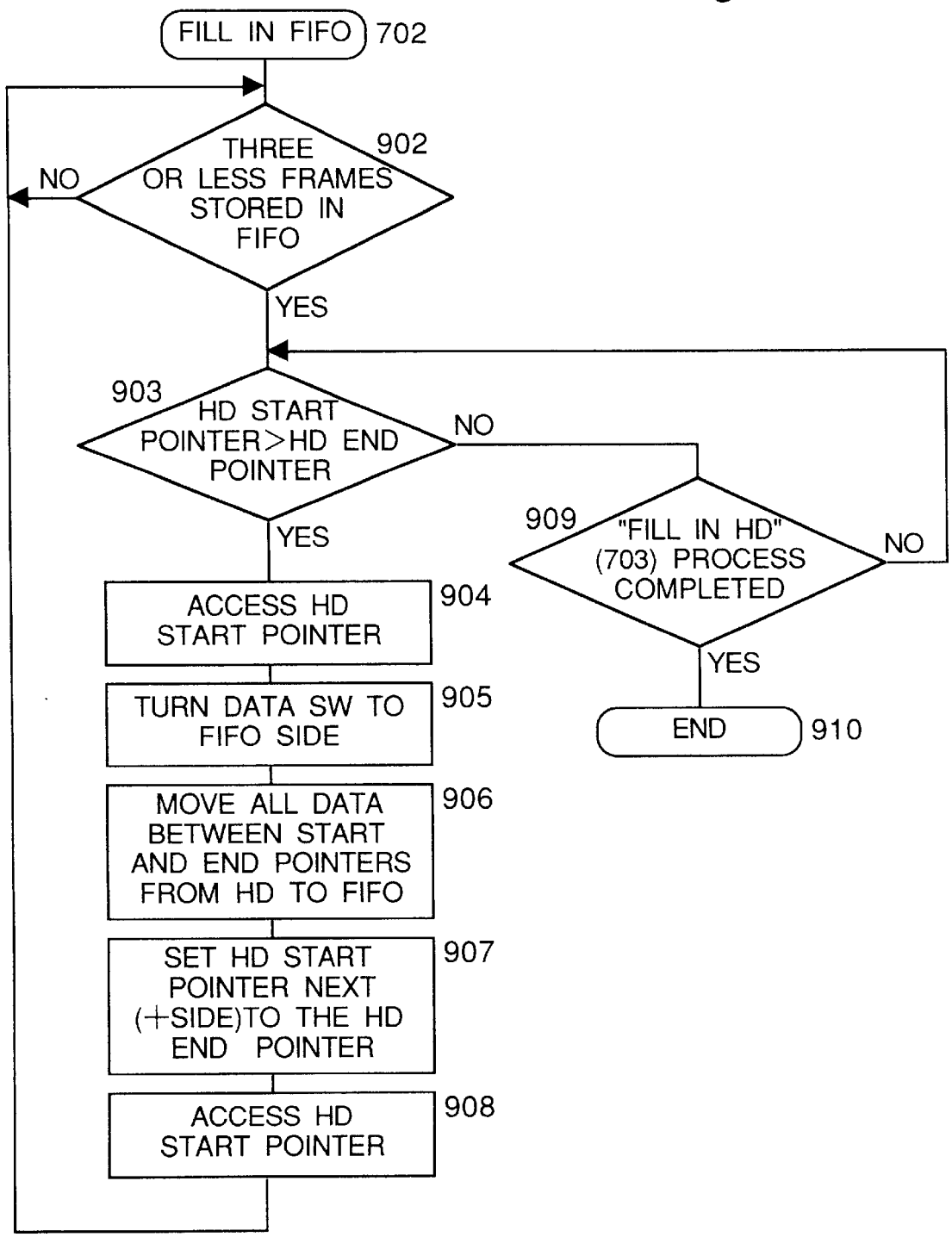
FIG. 9 is a detailed flow chart of the data FIFO buffer fill routine shown in FIG. 7.

FIG. 9 is a flow chart of the data FIFO buffer fill routine 702.

Once the data FIFO buffer fill routine starts, it is determined if there are 3 or fewer frames of compressed video data stored in the data FIFO buffer 108 (902). If there are, control flows to step 903; if not, it loops back to 902.

In step 903, the value of the HD buffer end pointer is compared with the value of the HD buffer start pointer to determine whether compressed video data that has not been output to the data FIFO buffer 108 is stored in the hard disk drive 107. If the end pointer is greater than the start pointer, as shown in FIG. 4B or 4D, it means that untransferred data remains in the hard disk. Then, control passes to step 904; control otherwise branches to step 909.

In step 904, the HD control signal 'c' is output to access the sector identified by the HD buffer start pointer.

In step 905, the data switch control signal 'd' is output to switch the data switch 109 to throughput data from the hard disk to the data FIFO buffer 108.

In step 906, the compressed video data stored to the hard disk buffer from the HD buffer start pointer to the HD buffer end pointer is output to the data FIFO buffer 108.

In step 907, the HD buffer start pointer is reset to the new value (HD buffer end pointer+1).

In step 908, there is no untransferred compressed video data left in the hard disk drive 107. The hard disk sector identified by the HD buffer start pointer is therefore accessed to prepare for data writing by the HD buffer fill routine 703, and control loops back to step 902.

If there is no compressed video data left in the hard disk drive 107, such as shown in FIG. 4A or 4C, control loops steps 909 and 903, repeatedly. During the looping of steps 903 and 909, the HD buffer fill routine 703 will be carried out to transfer data from the MO disk 104 to the hard disk drive 107. If, however, the HD buffer fill routine 703 is completed and no more data will therefore be transferred into the hard disk buffer 107 from the MO disk 104, the routine terminates (step 910). If data to be transferred to the hard disk buffer remains, however, control loops back to step 903 to await the data transfer.

The routine terminates at step 910.

Figure 10:
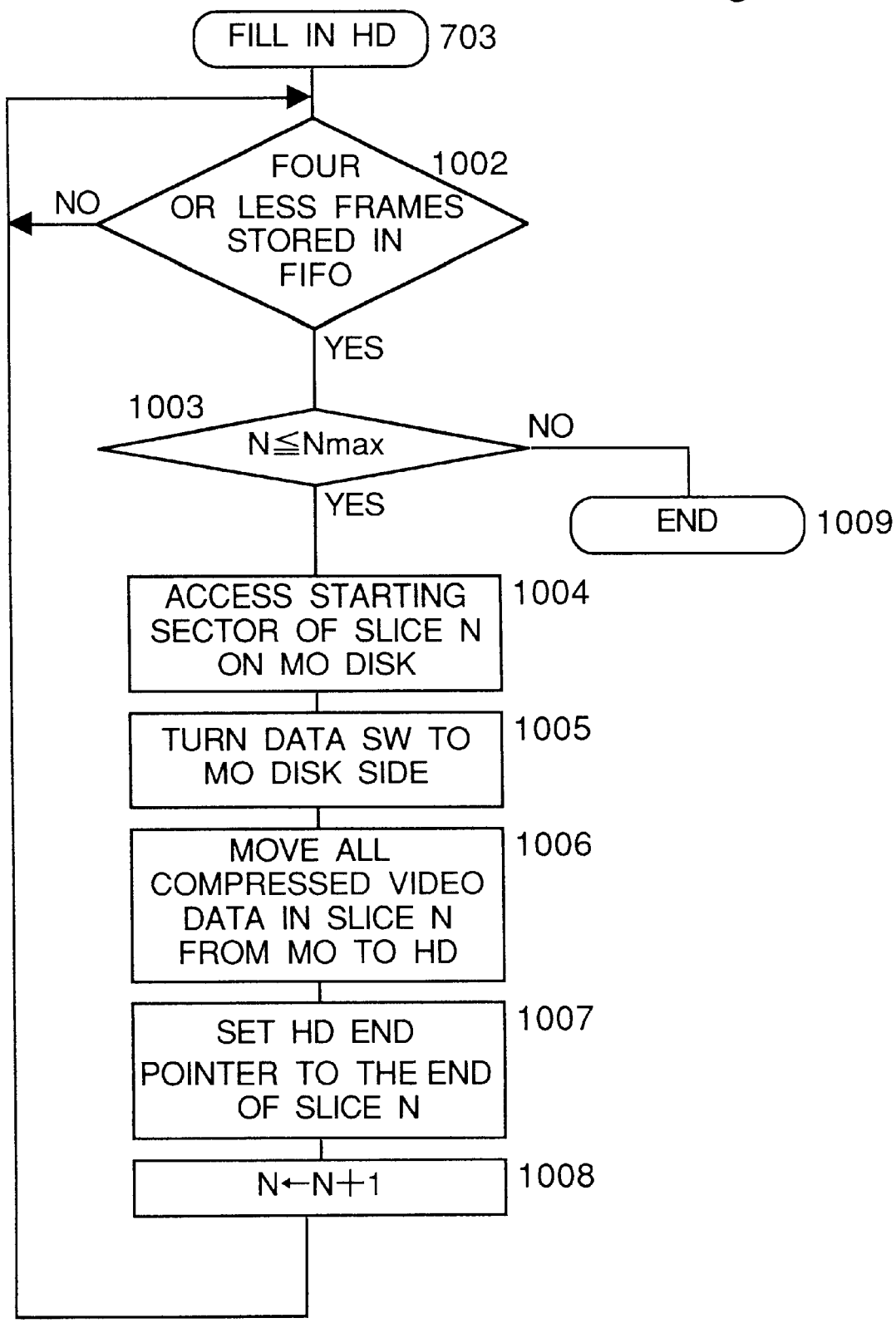
FIG. 10 is a detailed flow chart of the HD buffer fill routine shown in FIG. 7.

FIG. 10 is a flow chart of the HD buffer fill in routine 703.

Once the HD buffer fill routine starts, it is determined if there are four or fewer frames of compressed video data stored in the data FIFO buffer 108 (1002). If there are, control flows to step 1003; if not, it loops back to 1002.

In step 1003, the editing information 'a' is referenced to determine whether shot N is less than the maximum shot number $N_{max}$; if yes, the routine advances to step 1004; if not, it terminates (step 1009).

In step 1004, the MO disk drive control signal 'b' is output to access the starting sector of shot number N on the MO disk 104.

In step 1005, the data switch control signal 'd' is output to switch the data switch 109 to throughput data from the MO disk drive 105.

In step 1006, the compressed video data 'e' for shot N is written (moved) from the MO disk 104 to the hard disk drive 107 from the sector corresponding to the HD buffer start pointer. It is to be noted that at this time the hard disk drive 107 is already accessing the HD buffer start pointer based on step 908 of the HD buffer fill routine 703.

In step 1007, the HD buffer end pointer is set to the sector number of the hard disk 107 to which the last sector of shot N was written.

In step 1008, the counter is then incremented (N=N+1), and the process loops back to step 1002.

The process terminates in step 1009.

Figure 11:
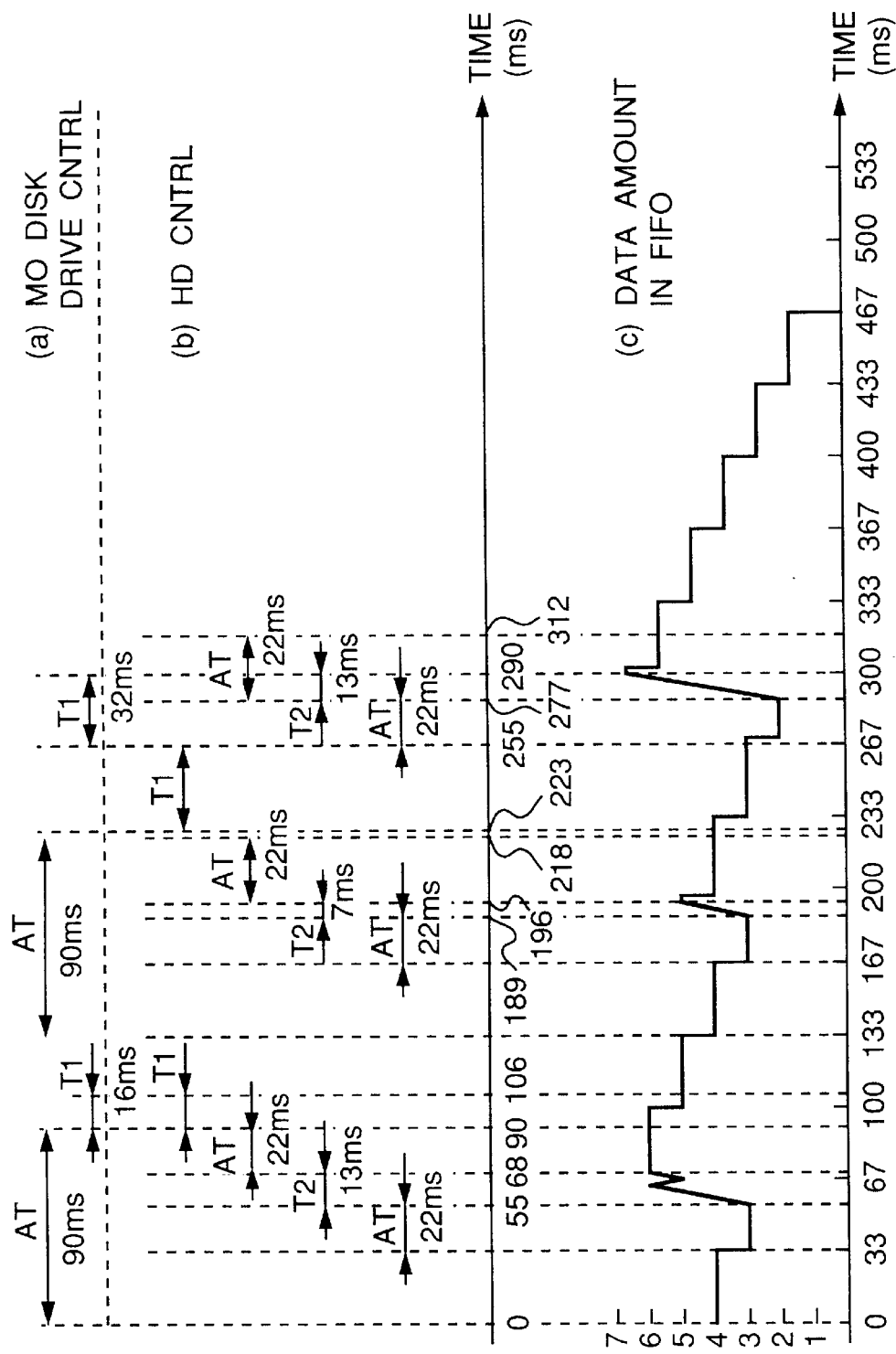
FIG. 11 is a diagram showing operation for storing data in the data FIFO buffer of FIG. 1.

Reproduction based on the editing information shown in FIG. 3 is shown in FIG. 11.

In FIG. 11, the upper section (a) illustrates control of the MO disk drive 105 with the passage of time; the middle section (b) shows the control of the hard disk drive 107; and the lower section (c) shows the change in the number of frames remaining in the data FIFO buffer 108.

When continuous reproduction starts, i.e., at 0 ms on the time scale, it is assumed that shot 1, i.e., shot A is already transferred to the data FIFO buffer 108, and that shot 2, i.e., shot C is stored in HD buffer 107. Thus, there are already four frames of shot 1 stored in the data FIFO buffer 108. The condition for the data FIFO buffer fill routine 703, particularly step 1002, is therefore satisfied, and the MO disk drive control signal 'b' is output to the MO disk drive 105 to access the starting sector ($6E0_H$) of shot 3, i.e., shot B, on the MO disk 104. The MO disk drive 105 therefore accomplishes a seek operation to access sector $6E0_H$. The worst-case access time required for this operation is 90 ms.

Thus, from the starting moment at 0 ms, access to the sector $6E0_H$ on the MO disk 104 starts and, at the same time, transfer of four frames of shot 1 from data FIFO buffer 108 to JPEG expander 110 starts. In other words, the access operation in MO disk 104 and the transfer operation in FIFO 108 are carried in parallel.

Figure 21:
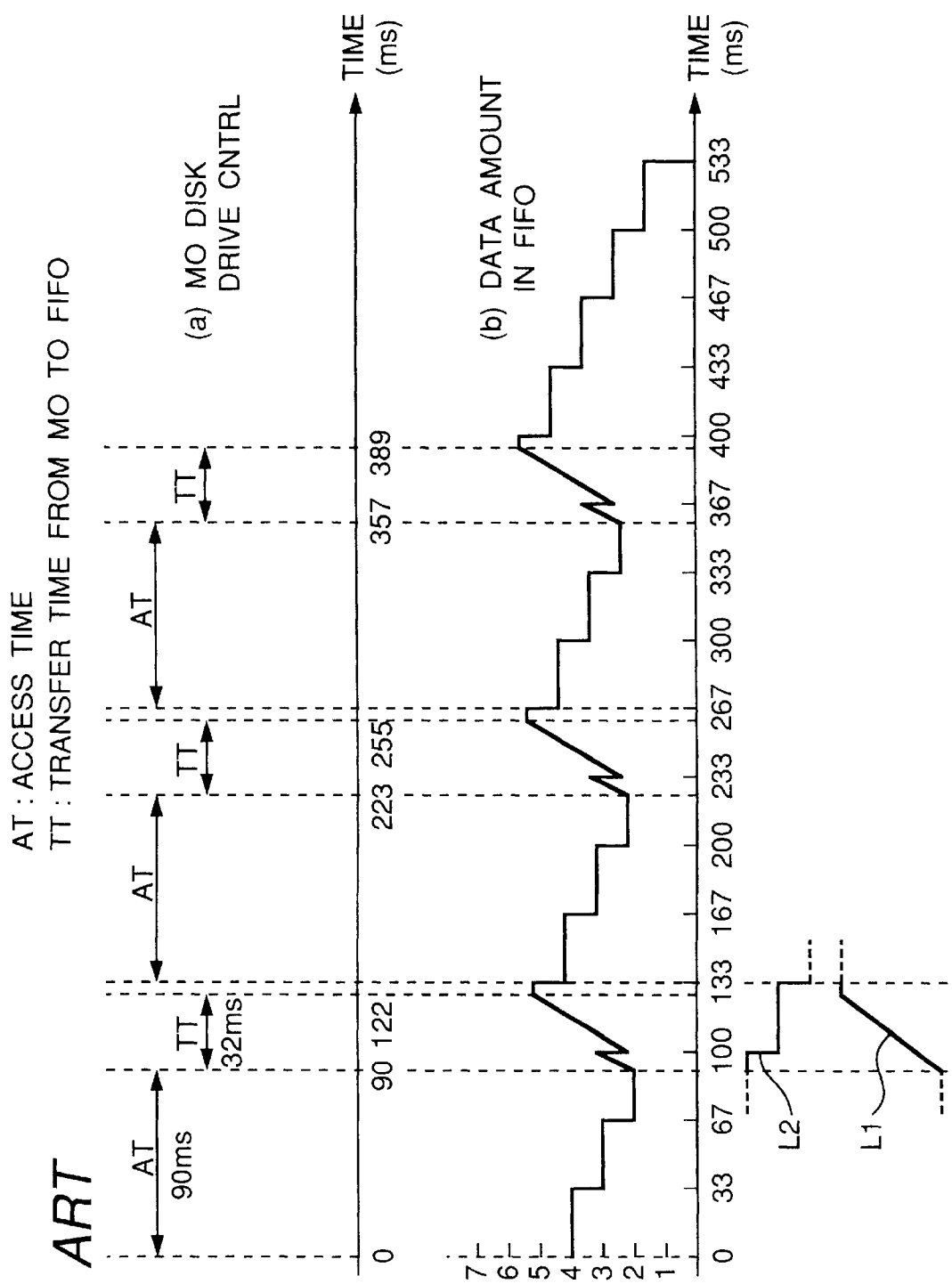
FIGS. 21 and 22 are diagrams showing operation for storing data in the data FIFO buffer shown in FIG. 13.
Figure 22:
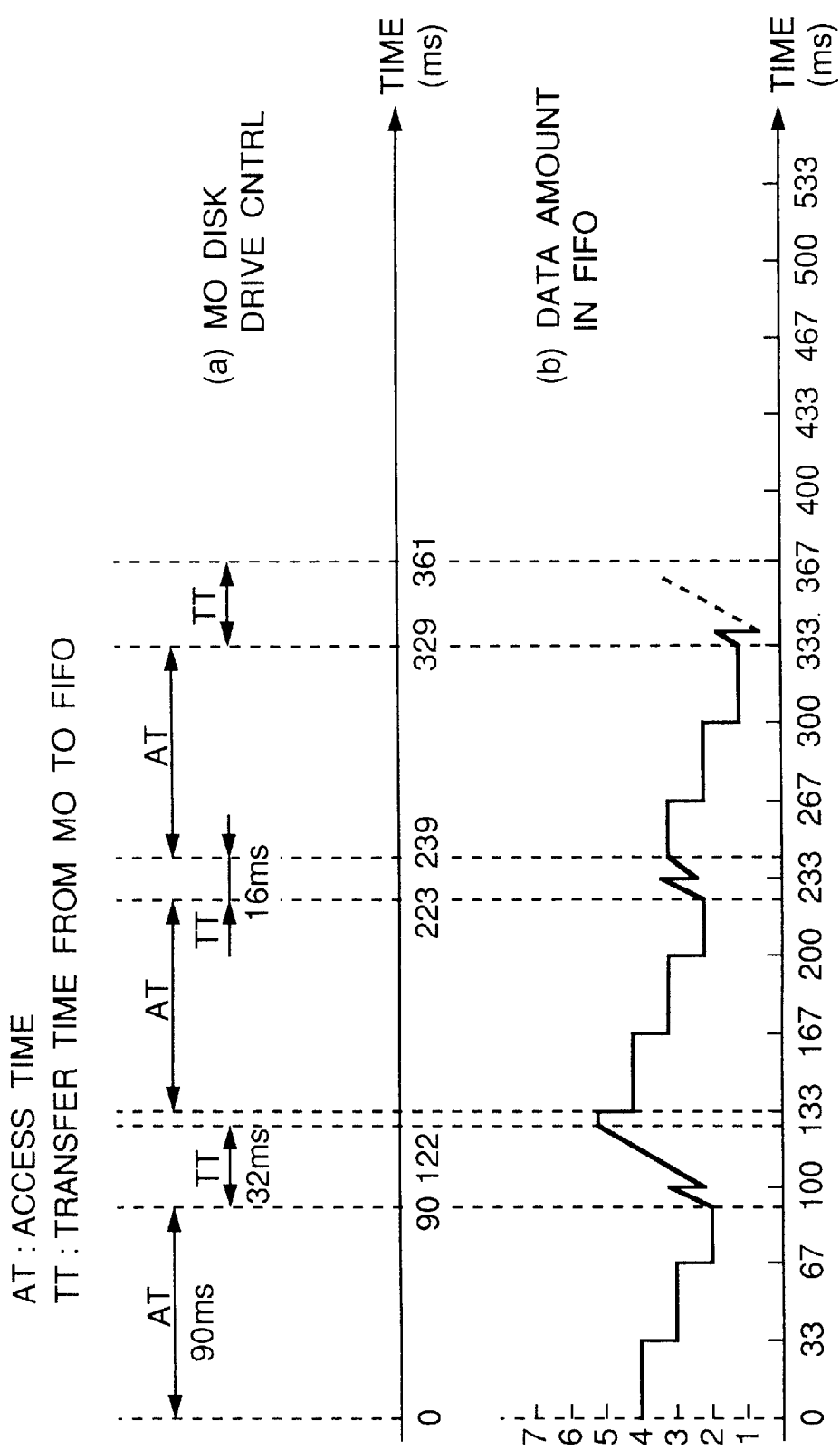

It is noted that the transfer of the frames from data FIFO buffer 108 to JPEG expander 110 is carried out such that, during one frame transfer, no data shift takes place in FIFO buffer 108, but when one frame data is transferred and expanded, data shift of one frame takes place in FIFO buffer 108. It takes about 33 ms to transfer one frame. Thus, as described above in connection with FIG. 21, the amount of data remaining in FIFO buffer 108 is decreased in steps.

After 33 ms, only 3 frames remain in the data FIFO buffer 108. Thus, the first test (902) of the data FIFO buffer fill routine 702 therefore returns YES, and the HD control signal 'c' is output to access the hard disk sector, $1040_H$, indicated by the HD buffer start pointer. The hard disk drive 107 therefore accomplishes a seek operation to access sector $1040_H$; the maximum seek time required for this operation is 22 ms.

Assuming the maximum seek time of 22 ms is required, at 55 ms after the start of continuous reproduction, the 64 sectors, or 32 kilobytes, of data from sector $1040_H$ pointed to by the HD buffer start pointer to sector $107F_H$ pointed to by the HD buffer end pointer is output from the hard disk 107 to the data FIFO buffer 108. Because the worst-case data transfer rate of the hard disk drive 107 is 20 megabits/sec., approximately 13 ms maximum is required for this data transfer; data transfer is therefore completed at 68 ms after the start of continuous reproduction.

At the end of this data transfer operation, the number of frames remaining in the data FIFO buffer 108 has increased to 6. During the increase time between 55 ms and 68 ms in FIG. 11, a serrated waveform is observed in section (c). The reason therefor is explained above in connection with FIG. 21.

After the data transfer, the HD buffer start pointer is reset (step 907) to $1080_H$, and the HD control signal 'c' is output (step 908) to access sector $1080_H$. The maximum seek time required for this operation is 22 ms.

At 90 ms after the start of continuous reproduction, the MO disk drive 105 has finished seeking sector $6E0_H$, and the hard disk drive 107 has finished seeking sector $1080_H$.

As a result, 16-kilobyte of compressed video data 'e' stored to the 32 sectors from $6E0_H$ to $6FF_H$ on the MO disk 104 are transferred to sectors $1080_H$ to $109F_H$ of the hard disk drive 107. Because the worst-case data transfer rate of the MO disk drive 105 is 8 megabits/sec., this transfer requires approximately 16 ms maximum; transfer is therefore completed at approximately 106 ms after the start of continuous reproduction.

The HD buffer end pointer is therefore reset to $109F_H$, and the counter N is incremented to $N=4=N_{max}$.

At 133 ms after the start of continuous reproduction, only 4 frames remain in the data FIFO buffer 108. The first test (1002) of the HD buffer fill routine 703 therefore returns YES, and the MO disk drive control signal 'b' is output to the MO disk drive 105 to access the starting sector ($90F60_H$) of shot 4, i.e., shot D, on the MO disk 104. The MO disk drive 105 therefore accomplishes a seek operation to access sector $90F60_H$. The worst-case access time required for this operation is 90 ms.

At 167 ms after the start of continuous reproduction, only 3 frames remain in the data FIFO buffer 108; the first test (902) of the data FIFO buffer fill routine 702 therefore returns YES, and the HD control signal 'c' is output to access the sector, $1080_H$, now indicated by the HD buffer start pointer of the hard disk drive 107. The hard disk drive 107 therefore accomplishes a seek operation to access sector $1080_H$; the maximum seek time required for this operation is 22 ms.

Assuming the maximum seek time of 22 ms is required, at 189 ms after the start of continuous reproduction, the 32 sectors, or 16 kilobytes, of data from sector $1080_H$ pointed to by the HD buffer start pointer to sector $109F_H$ pointed to by the HD buffer end pointer are output from the hard disk drive 107 to the data FIFO buffer 108. Because the worst-case data transfer rate of the hard disk drive 107 is 20 megabits/sec., approximately 7 ms maximum is required for this data transfer; data transfer is therefore completed at 196 ms after the start of continuous reproduction.

At the end of this data transfer operation, the number of frames remaining in the data FIFO buffer 108 has increased to 5.

After the data transfer, the HD buffer start pointer is reset (step 907) to $10A0_H$, and the HD control signal 'c' is output (step 908) to access sector $10A0_H$. The maximum seek time required for this operation is 22 ms.

At 223 ms after the start of continuous reproduction, the MO disk drive 105 has finished seeking sector $90F60_H$, and the hard disk drive 107 has finished seeking sector $10A0_H$.

As a result, 32-kilobyte of compressed video data 'e' stored to the 64 sectors from $90F60_H$ to $90F9F_H$ on the MO disk 104 are transferred to sectors $10A0_H$ to $10DF_H$ of the hard disk drive 107. Because the worst-case data transfer rate of the MO disk drive 105 is 8 megabits/sec., this transfer requires approximately 32 ms maximum; transfer is therefore completed at approximately 255 ms after the start of continuous reproduction.

The HD buffer end pointer is therefore reset to $10DF_H$, and the counter N is incremented to N=5.

At 233 ms after the start of continuous reproduction, the first test (902) of the data FIFO buffer fill routine 702 returns YES because the number of frames remaining in the data FIFO buffer 108 is again 3. However, because the HD buffer end pointer is set to $109F_H$ and the HD buffer start pointer remains set to $10A0_H$, test 903 of the data FIFO buffer fill routine 702 returns NO; the routine therefore loops through steps 909 and 903 until the HD buffer fill routine 703 is completed at 255 ms after the start of continuous reproduction.

The HD buffer end pointer is then updated to $10DF_H$ at 255 ms after the start of continuous reproduction. The HD control signal 'c' is output to access the sector, $10A0_H$, indicated by the HD buffer start pointer; the maximum seek time required for this operation is 22 ms.

Assuming the maximum seek time of 22 ms is required, at 277 ms after the start of continuous reproduction, the 64 sectors, or 32 kilobytes, of data from sector $10A0_H$ pointed to by the HD buffer start pointer to sector $10DF_H$ pointed to by the HD buffer end pointer are output from the hard disk drive 107 to the data FIFO buffer 108. Because the worst-case data transfer rate of the hard disk drive 107 is 20 megabits/sec., approximately 13 ms maximum is required for this data transfer; data transfer is therefore completed at 290 ms after the start of continuous reproduction.

At the end of this data transfer operation, the number of frames remaining in the data FIFO buffer 108 has increased to 6.

After the data transfer, the HD buffer start pointer is reset to $10E0_H$.

At 333 ms after the start of continuous reproduction, only 4 frames remain in the data FIFO buffer 108. The first test (1002) of the HD buffer fill routine 703 therefore returns YES. However, because at this time N=5, and $N \leq N_{max}$ is not satisfied, step 1003 in the HD buffer fill routine 703 returns NO, and the HD buffer fill routine 703 terminates (step 1009).

At 367 ms after the start of continuous reproduction, only 3 frames remain in the data FIFO buffer 108; the first test (902) of the data FIFO buffer fill routine 702 therefore returns YES. However, the HD buffer start pointer value $10E0_H$ is greater than the HD buffer end pointer value $10DF_H$, step 903 therefore returns NO, and the data FIFO buffer fill routine 702 branches to step 909.

This time through this loop, however, step 909 returns YES because the HD buffer fill routine 703 is already completed, and the data FIFO buffer fill routine 702 therefore also terminates.

The JPEG expansion control routine 701 deletes one frame of data from the data FIFO buffer 108 at each vertical synchronization cycle, and the JPEG expansion control routine 701 therefore terminates 467 ms after the start of continuous reproduction because test 802 in the JPEG expansion control routine 701 returns NO.

By means of the first embodiment of the invention thus described, images stored to a low performance medium such as a magneto-optical disk 104 can be continuously reproduced according to editing information as shown in FIG. 3 because the data FIFO buffer 108 will never be emptied before reproduction is completed.

It is to be noted that shot A is stored to sectors $1000_H$ to $103F_H$, shot B from sectors $1040_H$ to $107F_H$, shot C from sectors $1080_H$ to $109F_H$, and shot D from sectors $10A0_H$ to $107F_H$ of the hard disk drive 107 after reproduction is completed in this first embodiment.

As a result, it is not necessary to control the MO disk drive 105 to read from the MO disk 104 when this data is reproduced the next time.

Nonlinear editing of short noncontiguous data blocks and/or relatively large data blocks stored with a low data compression ratio is possible according to editing information compiled by the operator because the data is buffered to both a hard disk and a data FIFO buffer while using a low performance medium such as a magneto-optical disk by means of the first embodiment of the invention thus described.

Figure 12:
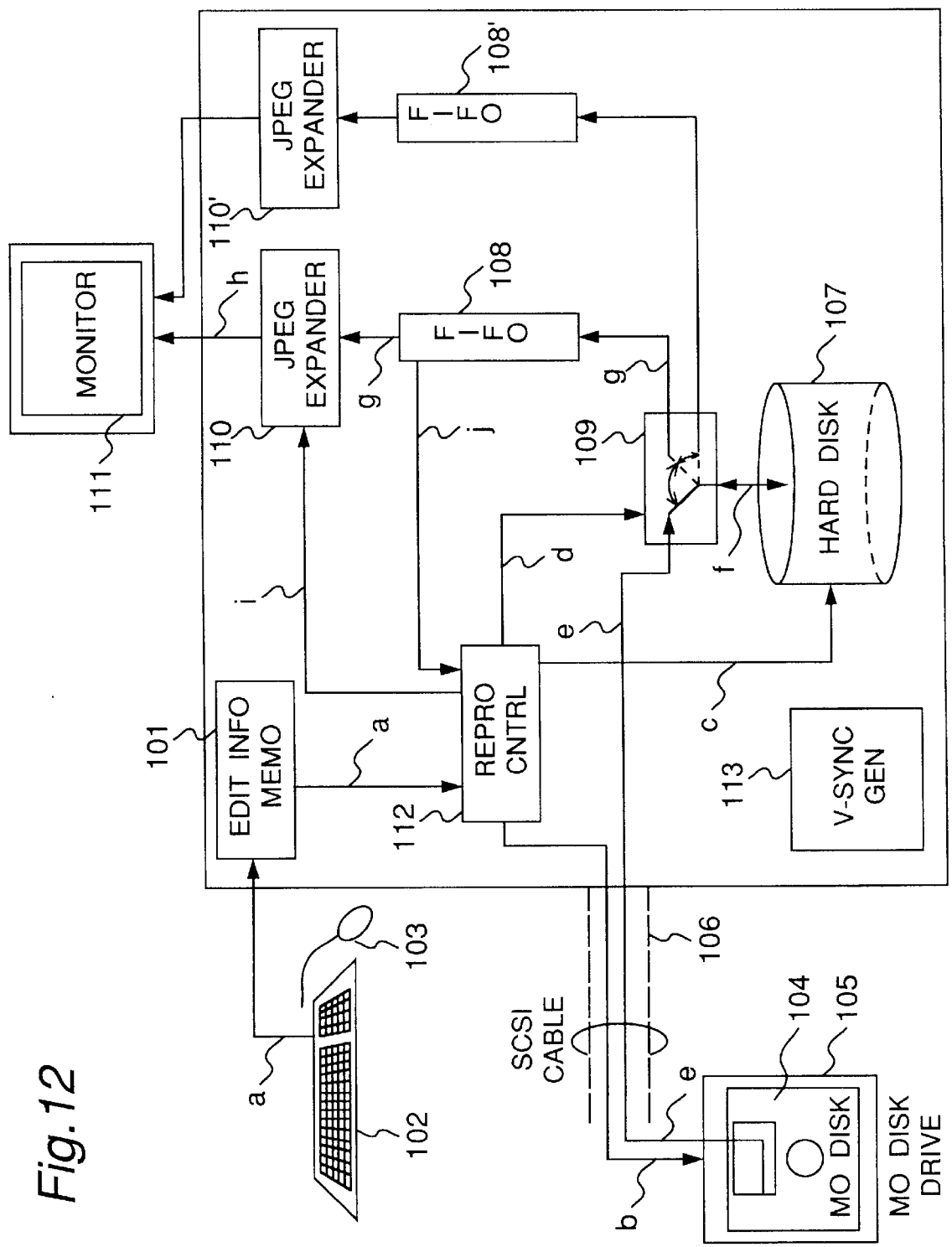
FIG. 12 is a view similar to that shown in FIG. 1, but showing a modification thereof.
Figure 13:
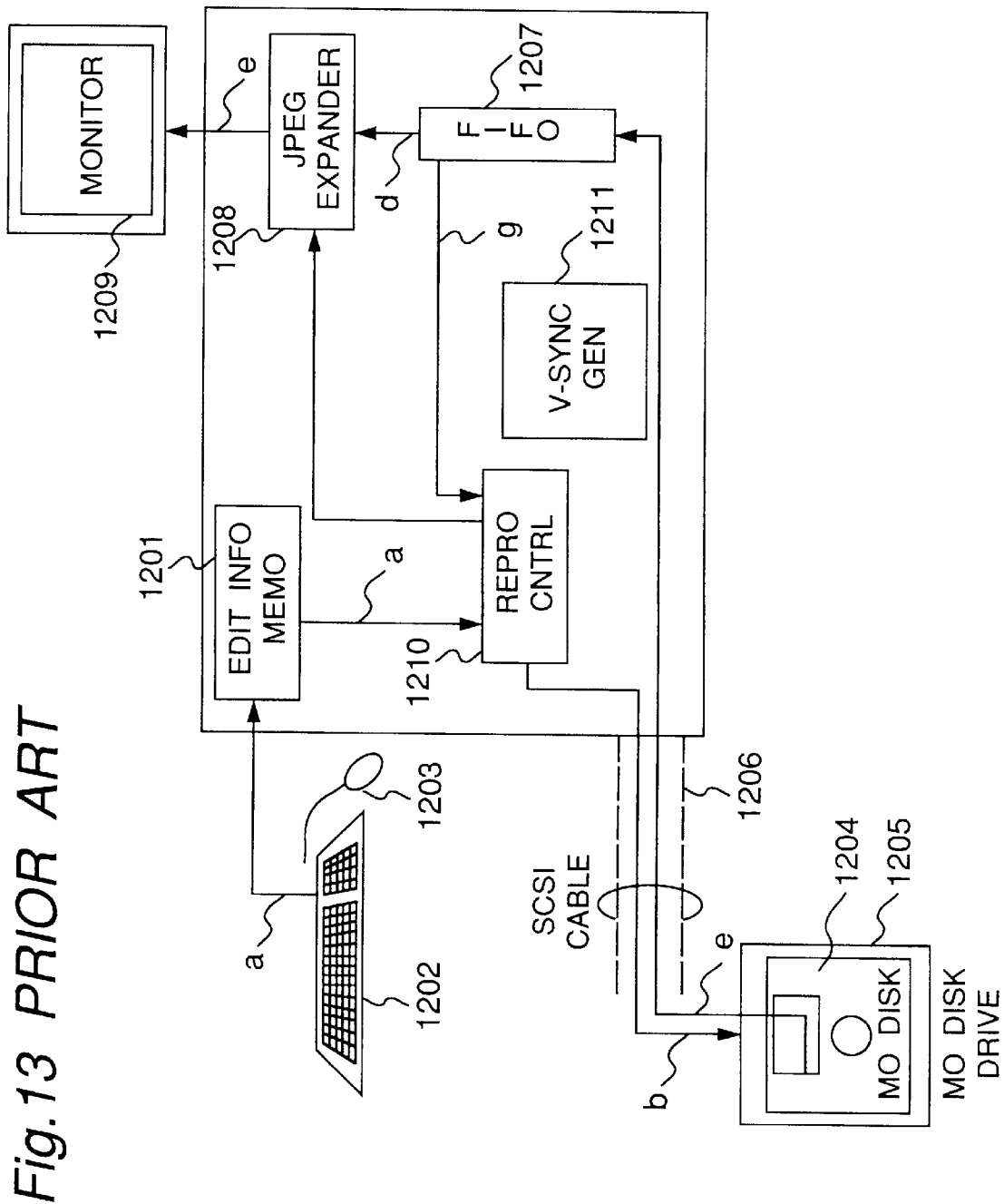
FIG. 13 is a block diagram of a nonlinear video editing apparatus according to the prior art.

The nonlinear video editing apparatus according to a first modification of the present invention is shown in FIG. 12. The first modification further has a second FIFO buffer 108' and a second JPEG expander 110', connected between the switch 109 and the monitor 111. Also, the switch 109 has another terminal that is connected to the second FIFO buffer 108'. Thus, it will be obvious that the present invention shall be applicable to two video output channels insofar as the hard disk provides comparable performance. By this arrangement, it is possible to present two different master tapes by a parallel operation; one from the JPEG expander 110 and another from JPEG expander 110'.

The nonlinear video editing apparatus according to a second modification of the invention is identical in configuration to the embodiment described above. What differs is the additional data stored to the editing information memory 101. The editing information memory 101 further stores the editing information of the sector positions at the start and end of each shot copied to the hard disk drive 107 during reproduction by the reproduction controller 112. The additional information is referenced during reproduction to transfer data already stored to the hard disk directly to the data FIFO buffer without reading from the magneto-optical disk.

As a result, the reproduction controller 112 is able to control reproduction to skip data transfers from the MO disk 104 when the required data has already been copied to and is present on the hard disk drive 107.

It will be obvious that continuous reproduction is also possible by means of this modification because data transfers from the low performance storage medium are eliminated.

Using the fact that the shot to be reproduced remains on the hard disk, the nonlinear video editing apparatus of the second embodiment can achieve nonlinear editing tolerant of even longer data blocks and lower compression ratios because transfers from the low performance magneto-optical medium are eliminated for shots stored to the hard disk.

It is to be noted that the preferred embodiment and modifications of the present invention have been described with reference to a removable magneto-optical disk medium, but the same effect can be obtained using any other low performance random access storage medium.

Examples of media that may be substituted for the magneto-optical disk medium of the embodiments include video database systems, VCRs with a high speed search capability, and digital video networks whereby video information is received from a remote location by packet communications.

A nonlinear video editing apparatus according to the present invention therefore offers significant real benefit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A nonlinear video editing apparatus comprising:
   first video data storage means for storing a video data, said first video data storage means having random access performance and data transfer performance;
   second video data storage means for continuously storing a plurality of contiguous frame sequences of the video data transferred from said first video data storage means, said second video data storage means having random access performance and data transfer performance, but with a higher speed random access performance than that of the first video storage means;
   FIFO buffer for storing the video data from the second video storage means and for continuously producing the stored video data;
   editing information memory means for storing editing information comprising:
      first and last frame time positions for each of said plurality of contiguous frame sequences before the video editing; and
      first and last frame time positions for each of said plurality of contiguous frame sequences after the video editing; and
   reproduction control means for transferring the video data from the first video storage means to the second video storage means responsive to said editing information stored in said editing memory means, wherein said reproduction control means transfers the video data from the first video storage means to the second video storage means when a quantity of the video data in said second video storage means is below a predetermined threshold value.

2. A nonlinear video editing apparatus according to claim 1, wherein said first video data storage means comprises a magneto-optical disk.

3. A nonlinear video editing apparatus according to claim 1, wherein said second video data storage means comprises a hard disk.

4. A nonlinear video editing apparatus according to claim 1, wherein said video data stored in said first video data storage means is compressed, and said apparatus further comprising a expander connected to said FIFO buffer for expanding the video data from said FIFO buffer.

5. A nonlinear video editing apparatus according to claim 1, further comprising a switching means for switching between a first connection between said first video data storage means and said second video data storage means and a second connection between said second video data storage means and said FIFO buffer.

6. A nonlinear video editing apparatus according to claim 1, wherein said video data stored on said second video data storage means is reproduced as a moving picture.

7. A nonlinear video editing apparatus comprising:
   first video data storage means for storing a video data, said first video data storage means having random access performance and data transfer performance;
   second video data storage means for continuously storing a plurality of contiguous frame sequences of the video data transferred from said first video data storage means, said second video data storage means having random access performance and data transfer performance, but with a higher speed random access performance than that of the first video storage means;
   FIFO buffer for storing the video data from the second video storage means and for continuously producing the stored video data;
   editing information memory means for storing editing information comprising:
      first and last frame time positions for each of said plurality of contiguous frame sequences before the video editing; and
      first and last frame time positions for each of said plurality of contiguous frame sequences after the video editing; and
   reproduction control means for a) transferring the video data from the first video storage means to the second video storage means responsive to said editing information stored in said editing memory means and b, transferring the video data from the second video storage means to the FIFO buffer, wherein said reproduction control means transfers the video data from the second video storage means to the FIFO buffer when a quantity of the video data in said FIFO buffer is below a predetermined threshold value.

8. A nonlinear video editing apparatus according to claim 7, wherein said first video data storage means comprises a magneto-optical disk.

9. A nonlinear video editing apparatus according to claim 7, wherein said second video data storage means comprises a hard disk.

10. A nonlinear video editing apparatus according to claim 8, wherein said video data stored in said first video data storage means is compressed, and said apparatus further comprising a expander connected to said FIFO buffer for expanding the video data from said FIFO buffer.

11. A nonlinear video editing apparatus according to claim 7, further comprising a switching means for switching between a first connection between said first video data storage means and said second video data storage means and a second connection between said second video data storage means and said FIFO buffer.

12. A nonlinear video editing apparatus according to claim 7, wherein said video data stored on said second video data storage means is reproduced as a moving picture.

13. A nonlinear video editing apparatus comprising:
    first video data storage means for storing a video data, said first video data storage means having random access performance and data transfer performance;
    second video data storage means for continuously storing a plurality of contiguous frame sequences of the video data transferred from said first video data storage means, said second video data storage means having random access performance and data transfer performance, but with a higher speed random access performance than that of the first video storage means;
    FIFO buffer for storing the video data from the second video storage means and for continuously producing the stored video data;
    editing information memory means for storing editing information comprising:
        first and last frame time positions for each of said plurality of contiguous frame sequences before the video editing; and
        first and last frame time positions for each of said plurality of contiguous frame sequences after the video editing;
        wherein said first and last frame time positions before the video editing and said first and last frame time positions after the video editing are stored in said editing information memory means simultaneously; and
    reproduction control means for transferring the video data from the first video storage means to the second video storage means responsive to said editing information stored in said editing memory means.

14. A nonlinear video editing apparatus according to claim 13, wherein said first video data storage means comprises a magneto-optical disk.

15. A nonlinear video editing apparatus according to claim 13, wherein said second video data storage means comprises a hard disk.

16. A nonlinear video editing apparatus according to claim 13, wherein said video data stored in said first video data storage means is compressed, and said apparatus further comprising a expander connected to said FIFO buffer for expanding the video data from said FIFO buffer.

17. A nonlinear video editing apparatus according to claim 13, further comprising a switching means for switching between a first connection between said first video data storage means and said second video data storage means and a second connection between said second video data storage means and said FIFO buffer.

18. A nonlinear video editing apparatus according to claim 13, wherein said video data stored on said second video data storage means is reproduced as a moving picture.

* * * * *

UNITED STATES PATENT AND TRADEMARK OFFICE
CERTIFICATE OF CORRECTION

PATENT NO. : 5,905,842
DATED : May 18, 1999
INVENTOR(S) : Kajimoto

Page 1 of 3

Figure 16:
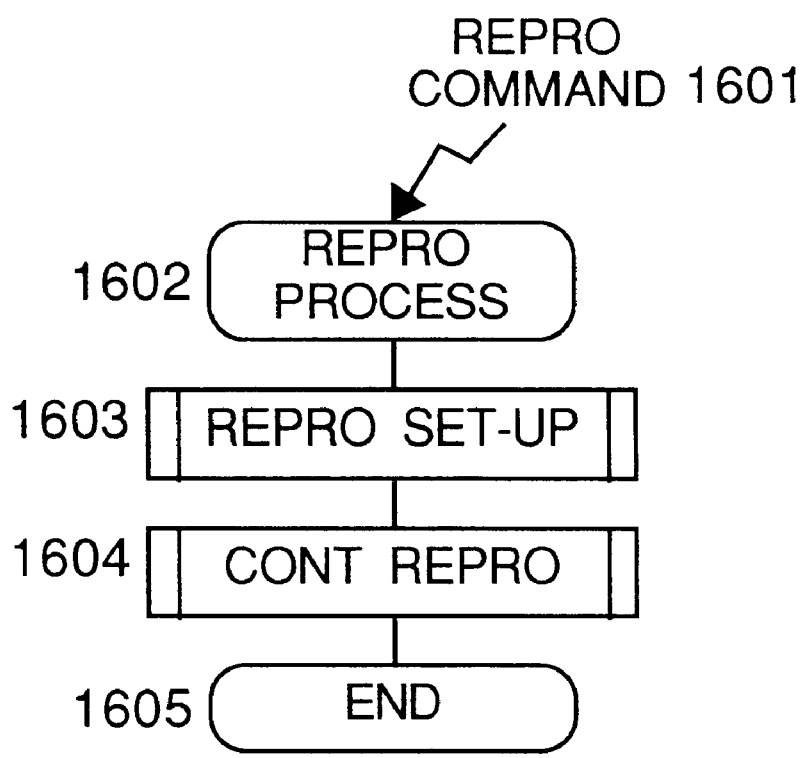
FIG. 16 is a flow chart of the reproduction process of the reproduction controller of FIG. 13.
Figure 17:
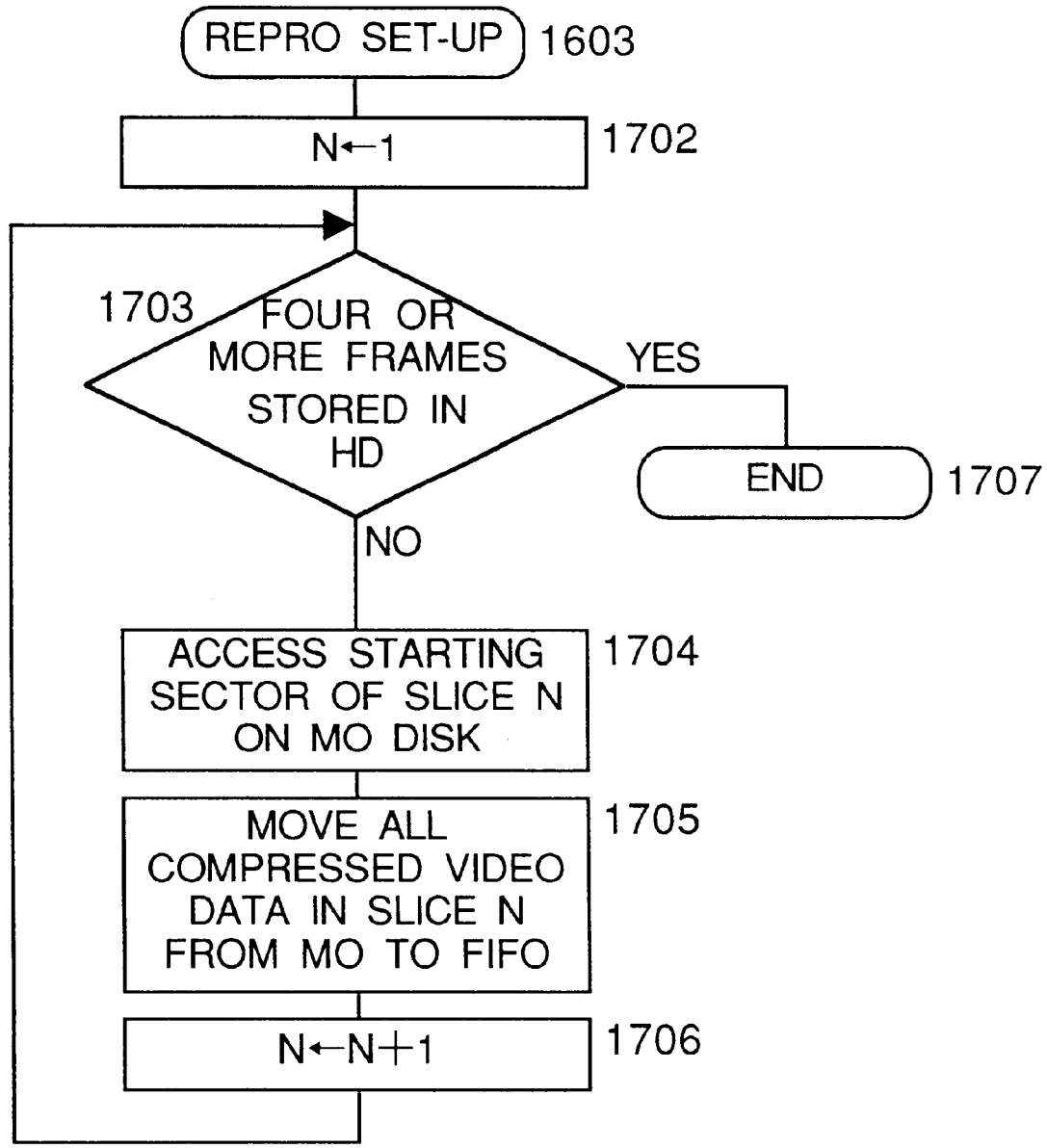
FIG. 17 is a detailed flow chart of the reproduction set-up process shown in FIG. 16.
Figure 18:
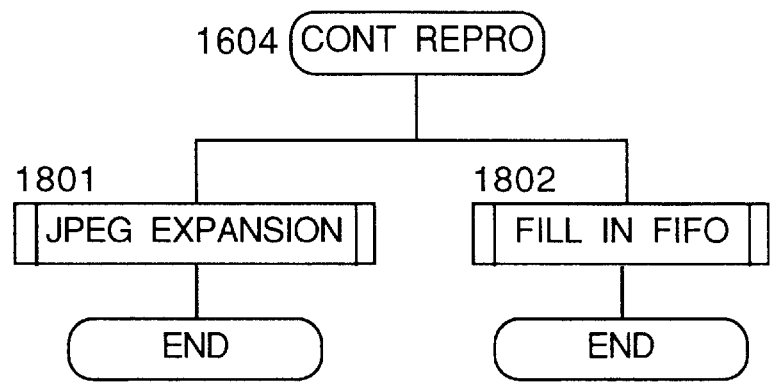
FIG. 18 is a flow chart of the continuous reproduction process shown in FIG. 16.
Figure 19:
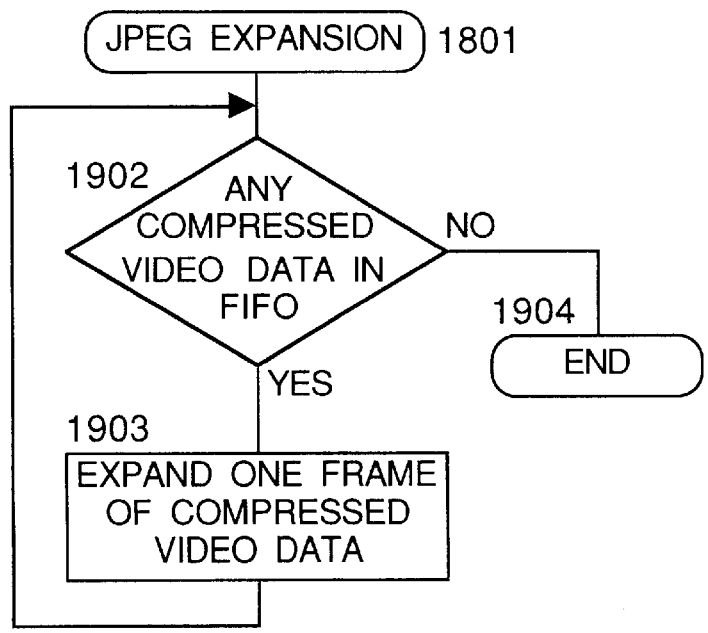
FIG. 19 is a detailed flow chart of the JPEG expansion control process shown in FIG. 18.
Figure 20:
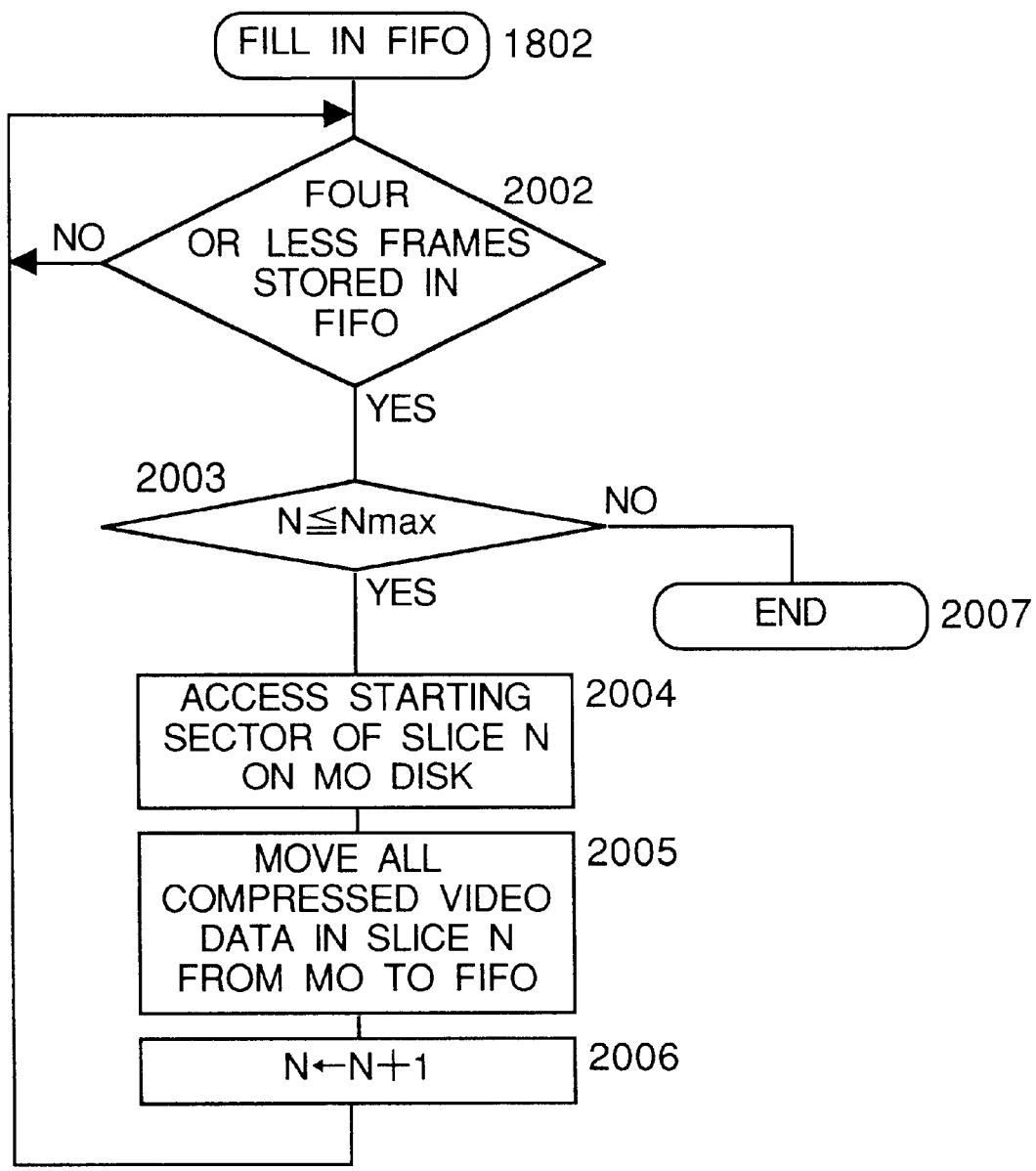
FIG. 20 is a detailed flow chart of the data FIFO buffer fill routine shown in FIG. 18.

It is certified that error appears in the above-identified patent and that said Letters Patent is hereby corrected as shown below:

In the drawing Figs. 3 and 16 should be deleted to be replaced with the corrected Figs. 3 and 16.

Signed and Sealed this

First Day of February, 2000

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,905,842
DATED : May 18, 1999
INVENTOR(S) : Kajimoto

It is certified that error appears in the above-identified patent and that said Letters Patent is hereby corrected as shown below:

Fig.3 PRIOR ART

| SOURCE VIDEO TAPE | | | MASTER VIDEO TAPE | | |
|---|---|---|---|---|---|
| SLICE NAME | FIRST FRAME NO. | LAST FRAME NO. | SLICE NO. | FIRST FRAME NO. | LAST FRAME NO. |
| A | 101 | 104 | 1 | 1 | 4 |
| C | 37101 | 37104 | 2 | 5 | 8 |
| B | 111 | 112 | 3 | 9 | 10 |
| D | 37111 | 37114 | 4 | 11 | 14 |

UNITED STATES PATENT AND TRADEMARK OFFICE
CERTIFICATE OF CORRECTION

PATENT NO. :  5,905,842
DATED      :  May 18, 1999
INVENTOR(S):  Kajimoto

It is certified that error appears in the above-identified patent and that said Letters Patent is hereby corrected as shown below:

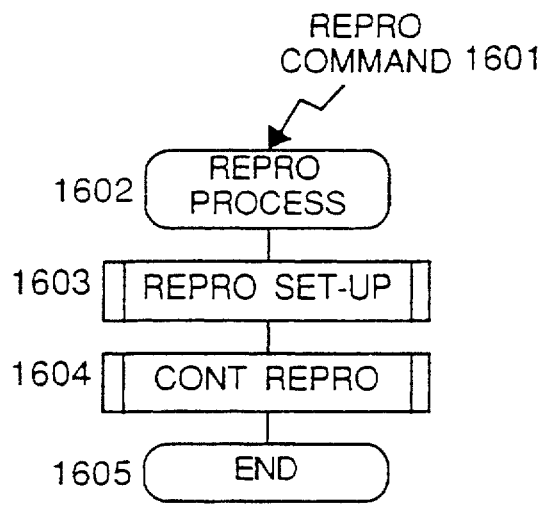

PRIOR ART  Fig.16